(12) United States Patent
Oshima et al.

(10) Patent No.: US 12,505,746 B2
(45) Date of Patent: Dec. 23, 2025

(54) TRAFFIC SAFETY SUPPORT SYSTEM

(71) Applicant: HONDA MOTOR CO., LTD., Tokyo (JP)

(72) Inventors: Takashi Oshima, Saitama (JP);
Yoshitaka Mimura, Saitama (JP);
Shinsuke Odai, Tokyo (JP); Takahiro Kurehashi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 204 days.

(21) Appl. No.: 18/190,987

(22) Filed: Mar. 28, 2023

(65) Prior Publication Data

US 2023/0316923 A1 Oct. 5, 2023

(30) Foreign Application Priority Data

Mar. 31, 2022 (JP) ................................ 2022-060709

(51) Int. Cl.
*G08G 1/16* (2006.01)

(52) U.S. Cl.
CPC ............ *G08G 1/164* (2013.01); *G08G 1/166* (2013.01)

(58) Field of Classification Search
None
See application file for complete search history.

(56) References Cited

U.S. PATENT DOCUMENTS

| | | | |
|---|---|---|---|
| 9,360,332 B2 * | 6/2016 | Strauss | G06V 10/507 |
| 11,718,314 B1 * | 8/2023 | Nallani | B60K 37/00 |
| | | | 340/903 |

| | | | |
|---|---|---|---|
| 2012/0330541 A1 | 12/2012 | Sakugawa et al. | |
| 2021/0245744 A1 | 8/2021 | Mangalam et al. | |
| 2021/0300362 A1 | 9/2021 | Yasui | |

(Continued)

FOREIGN PATENT DOCUMENTS

| | | |
|---|---|---|
| CN | 102792349 A | 11/2012 |
| CN | 113442947 A | 9/2021 |

(Continued)

OTHER PUBLICATIONS

Notification of Reasons for Refusal issued Jul. 29, 2025 in the JP Patent Application No. 2022-060709.

(Continued)

*Primary Examiner* — Jason Holloway
*Assistant Examiner* — Atticus A Cameron
(74) *Attorney, Agent, or Firm* — CKC & Partners Co., LLC

(57) ABSTRACT

A traffic safety support system 1 includes a recognizer configured to recognize traffic participants present near a mobile body 94 that is a support target, a notification device configured to make a risk notification to a driver of the support target, and a risk notification specifier configured to set an operation manner of the risk notification. In a case where the support target is traveling on the road and a first pedestrian 95 is present ahead of the support target, the risk notification specifier calculates a risk value of the first pedestrian 95 and the support target on the road 90 on the basis of the recognition information, and in a case where the risk value exceeds a threshold, sets ON of the risk notification. The risk notification specifier calculates the risk value on the basis of the number of pedestrians present in the vicinity of the first pedestrian 95.

9 Claims, 8 Drawing Sheets

(56) References Cited

U.S. PATENT DOCUMENTS

2022/0169245 A1    6/2022  Hieida et al.
2024/0412637 A1*  12/2024  Inoue ..................... G08G 1/00

FOREIGN PATENT DOCUMENTS

| | | |
|---|---|---|
| JP | 2004110394 A | 4/2004 |
| JP | 2008114613 A | 5/2008 |
| JP | 2008143387 A | 6/2008 |
| JP | 2019074431 A | 5/2019 |
| JP | 2020013173 A | 1/2020 |
| JP | 2020119148 A | 8/2020 |
| JP | 2021155024 A | 10/2021 |
| JP | 2021157403 A | 10/2021 |
| WO | 2020202741 A1 | 10/2020 |

OTHER PUBLICATIONS

Office Action issued Nov. 7, 2025 in the CN Patent Application No. 202310320198.0.
Notification of Reasons for Refusal issued Nov. 11, 2025 in the JP Patent Application No. 2022-060709.

\* cited by examiner

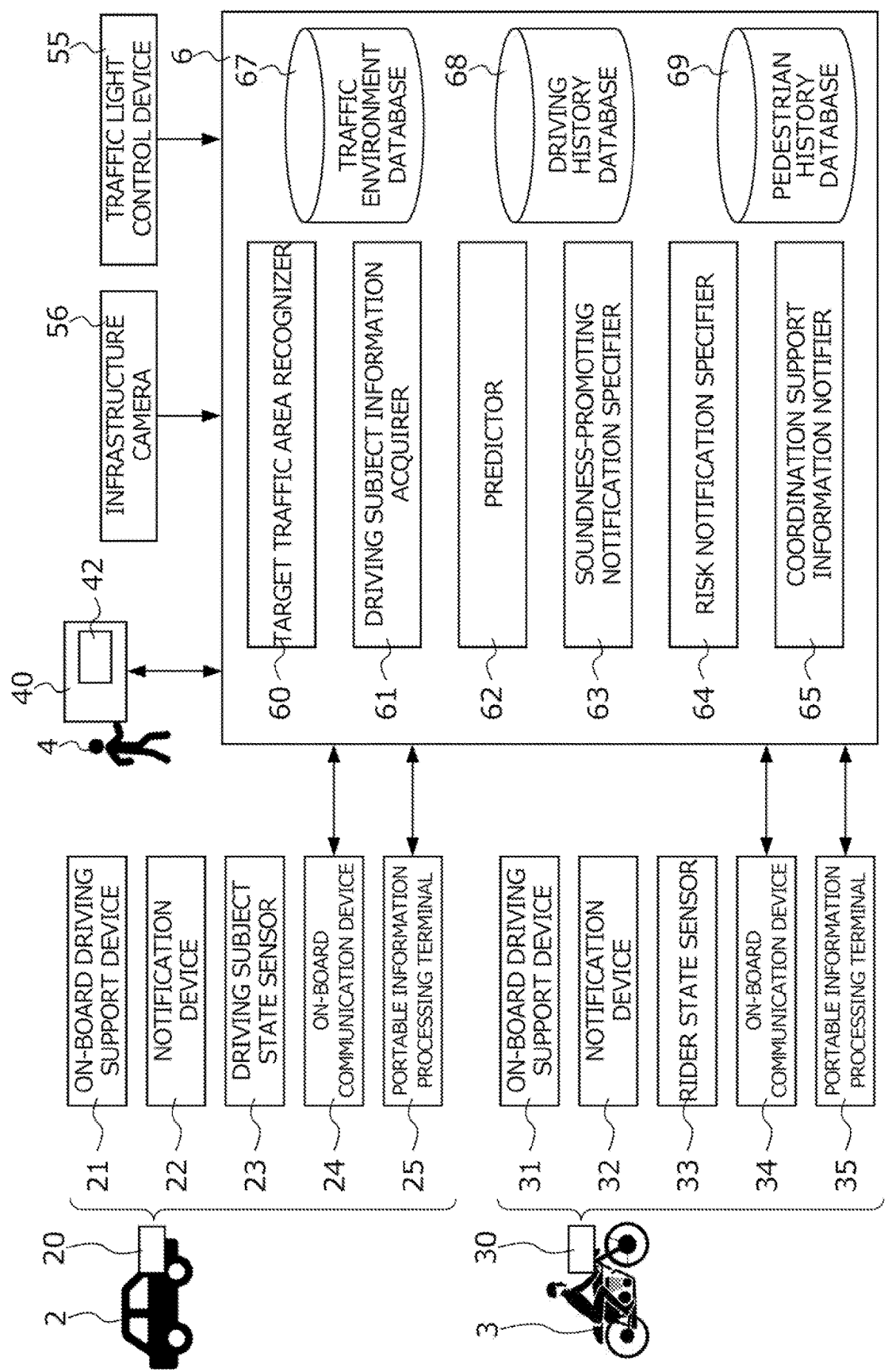

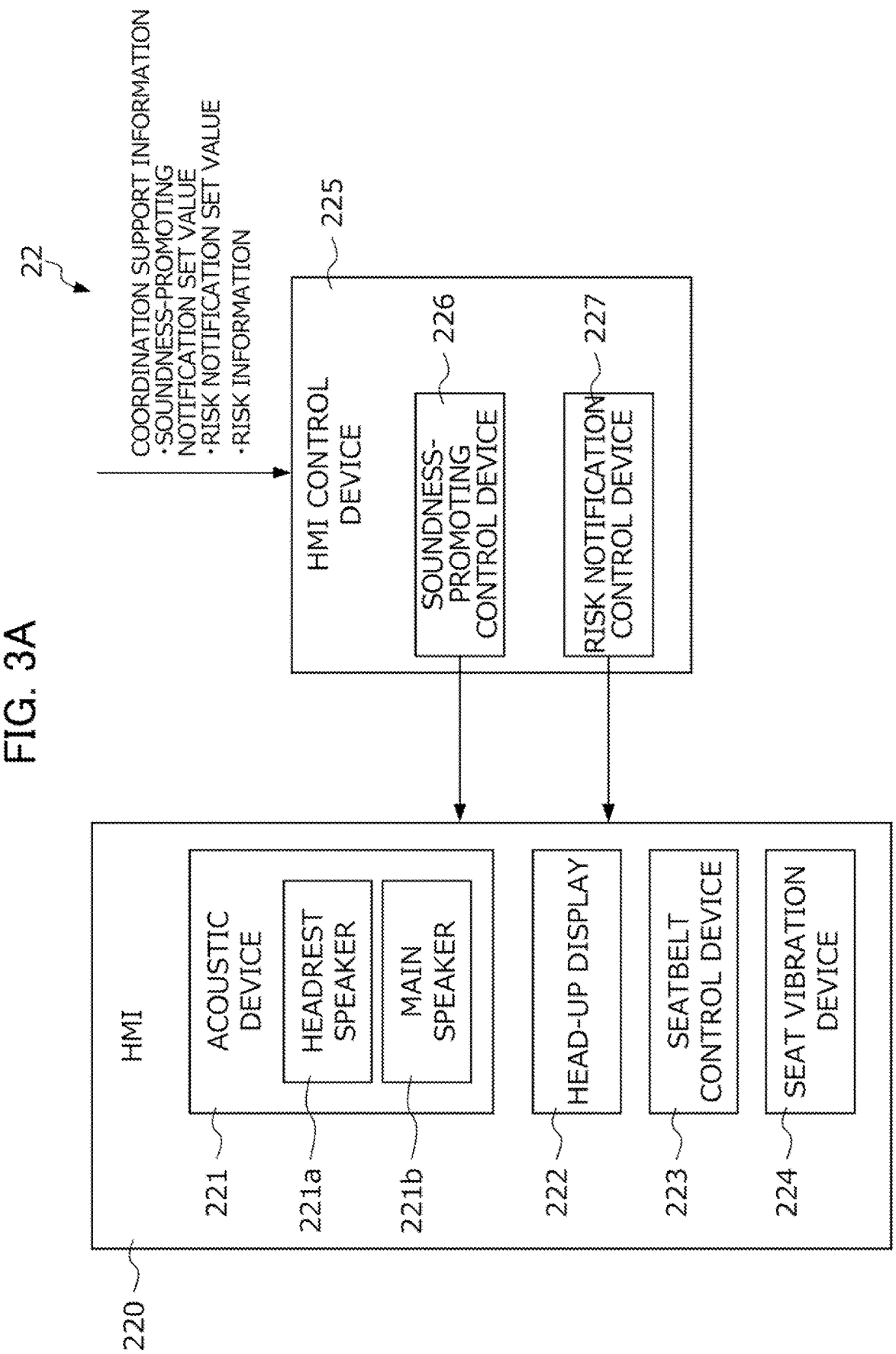

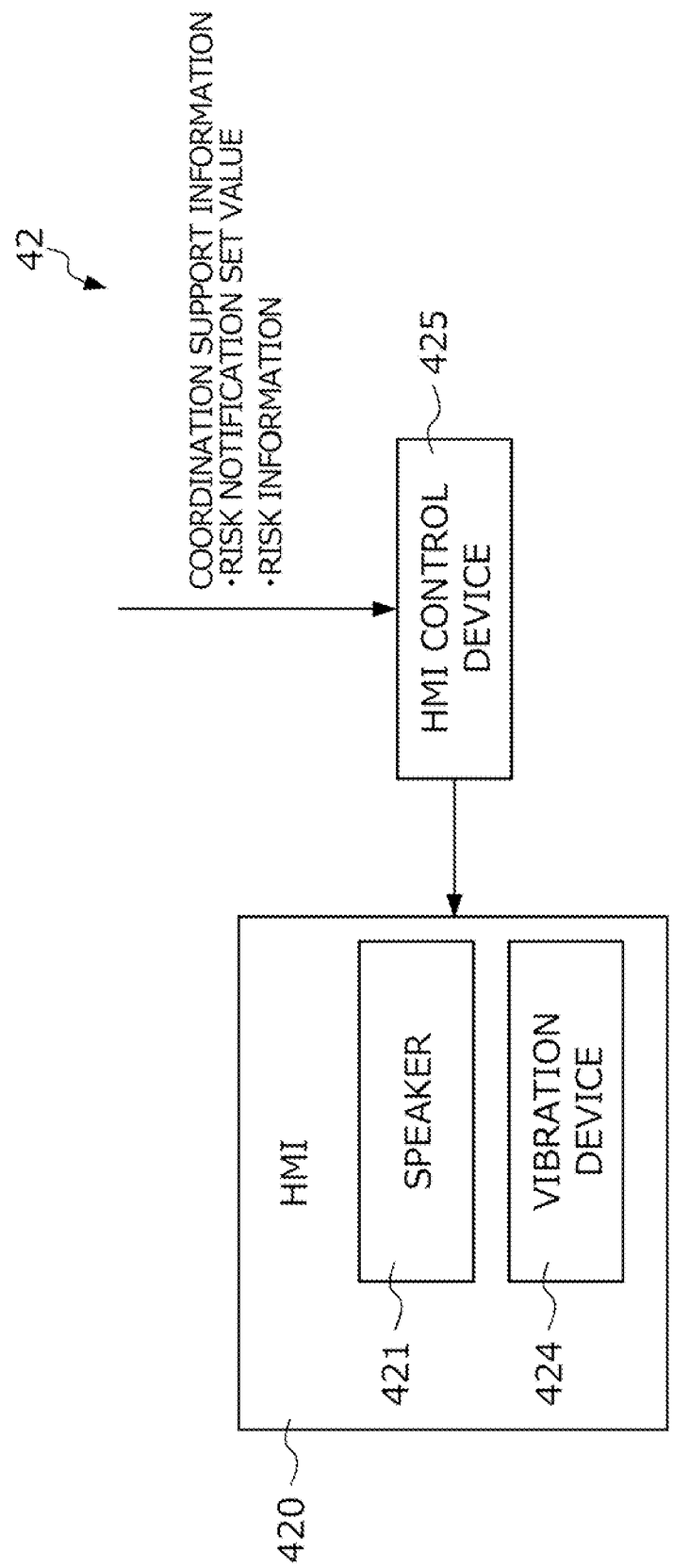

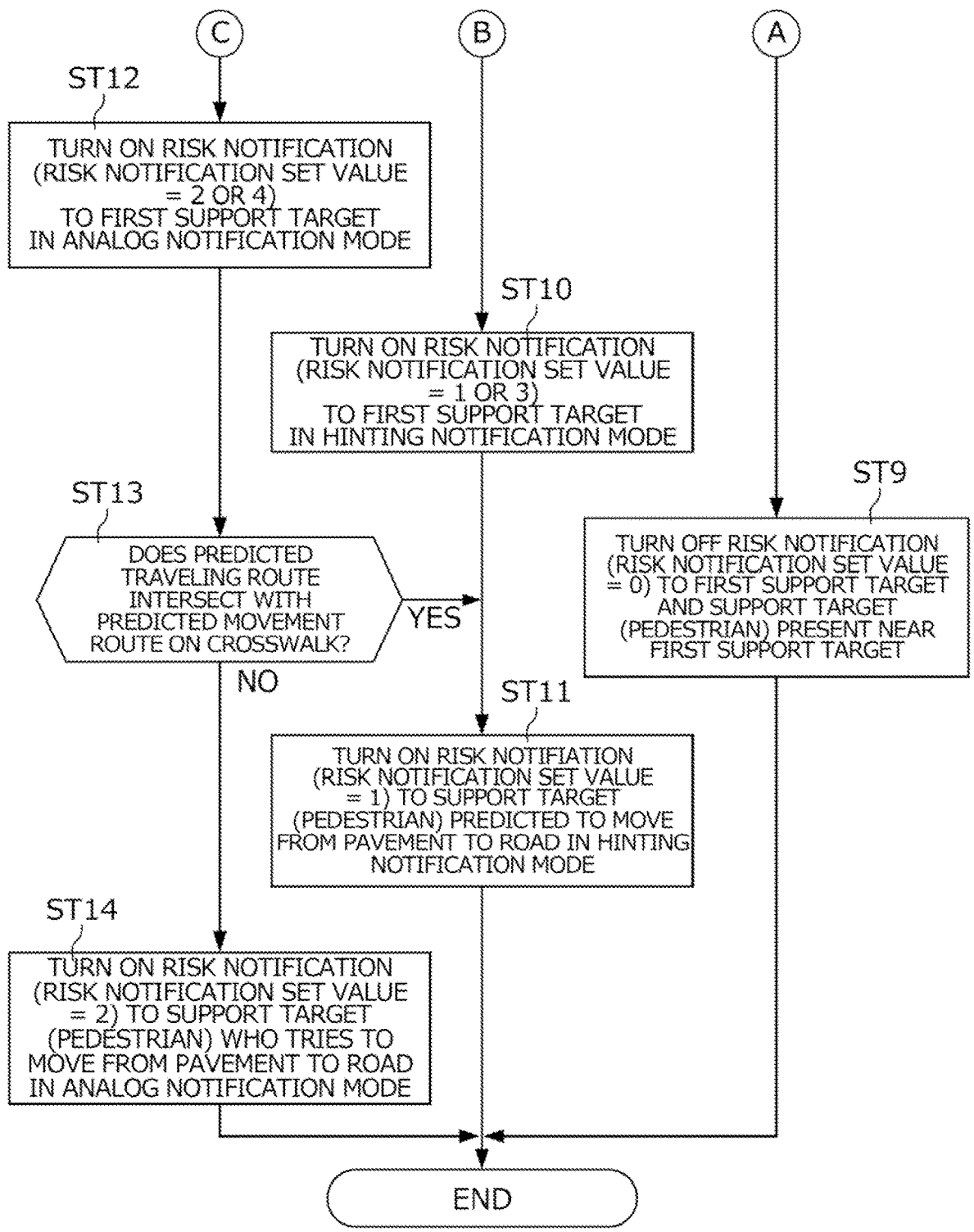

TRAFFIC SAFETY SUPPORT SYSTEM

This application is based on and claims the benefit of priority from Japanese Patent Application No. 2022-060709, filed on 31 Mar. 2022, the content of which is incorporated herein by reference.

BACKGROUND OF THE INVENTION

Field of the Invention

The present invention relates to a traffic safety support system. More particularly, the present invention relates to a traffic safety support system that supports safe movement of mobile bodies that travel on a road and pedestrians who move on a pavement adjacent to the road.

Related Art

In public traffic, various traffic participants, such as mobile bodies including four-wheeled automobiles, motorcycles, bicycles, etc. as well as pedestrians, move at different speeds in accordance with their individual intentions. As a technique for improving safety, convenience, and the like of traffic participants in such public traffic, for example, Japanese Unexamined Patent Application, Publication No. 2008-143387 discloses a driving support device that assists a driver in safely driving a vehicle.

The driving support device disclosed in Japanese Unexamined Patent Application, Publication No. 2008-143387 recognizes presence of pedestrians near the own vehicle provided with the driving support device and a state of a pavement and provides a notification to the driver in a case where there is a possibility that a pedestrian may run out into the road on the basis of the recognition result.

Patent Document 1: Japanese Unexamined Patent Application, Publication No. 2008-143387

SUMMARY OF THE INVENTION

While the driving support device disclosed in Japanese Unexamined Patent Application, Publication No. 2008-143387 recognizes a width and a height of a pavement, whether or not there is a guardrail, a height of the guardrail, and the like, as the state of the pavement, it is difficult to specify a factor that induces a pedestrian on the pavement to run out into a road only by way of such a state of the pavement.

The present invention is directed to providing a traffic safety support system capable of improving safety, convenience and smoothness of traffic for mobile bodies that travel on a road and pedestrians who move on a pavement adjacent to the road.

(1) One aspect of the present invention is directed to a traffic safety support system for assisting a driver in driving a support target being a mobile body. The traffic safety support system includes a recognizer configured to recognize traffic participants present near the support target and traffic environments around the support target, and acquire recognition information; a notification device configured to provide a risk notification to the driver; and a risk notification specifier configured to set an operation manner of the risk notification on the basis of the recognition information. The risk notification specifier includes a contact risk value calculator configured to, in a case where the support target is traveling on a road adjacent to a pavement and a first pedestrian is present ahead of the support target on the pavement, calculate a contact risk value of contact between the first pedestrian and the support target on the road on the basis of the recognition information; and a specifier configured to, in a case where the contact risk value exceeds a predetermined threshold, set the risk notification to ON. The contact risk value calculator calculates the contact risk value on the basis of the number of pedestrians present in the vicinity of the first pedestrian on the pavement.

(2) In this case, the traffic safety support system preferably further includes a predictor configured to predict a first predicted movement route of the first pedestrian on the pavement and a second predicted movement route of a second pedestrian present in the vicinity of the first pedestrian on the basis of the recognition information, and the contact risk value calculator preferably calculates the contact risk value on the basis of whether or not the first predicted movement route intersects with the second predicted movement route.

(3) In this case, the contact risk value calculator preferably calculates the contact risk value on the basis of both or one of a first pavement width occupancy that is a proportion of the first pedestrian to a pavement width and a second pavement width occupancy that is a proportion of the second pedestrian to the pavement width.

(4) In this case, the notification device is capable of providing the risk notification in a plurality of notification modes with different notification intensities, and the specifier preferably sets a first mode as the notification mode in a case where a predicted traveling route of the support target intersects with neither the first predicted movement route nor the second predicted movement route on the road and the contact risk value exceeds the threshold, and sets a second mode with a higher notification intensity than the first mode as the notification mode in a case where the predicted traveling route intersects with the first predicted movement route or the second predicted movement route on the road.

(5) In this case, the contact risk value calculator preferably estimates a position of a predicted point at which the first pedestrian or the second pedestrian moves from the pavement to the road on the basis of the first predicted movement route and the second predicted movement route and calculates the contact risk value on the basis of the position of the predicted point.

(6) Another aspect of the present invention is directed to a traffic safety support system for supporting a driver in driving a first support target being a mobile body and supporting a second support target being a pedestrian in moving. The traffic safety support system includes: a recognizer configured to recognize traffic participants present near the support target and traffic environments around the first support target, and acquire recognition information; a first notification device configured to provide a risk notification to the driver of the first support target; a second notification device configured to provide the risk notification to the second support target; and a risk notification specifier configured to set an operation manner in which the first notification device and the second notification device provide the risk notification, on the basis of the recognition information. The risk notification specifier includes: a contact risk value calculator configured to, in a case where the first support target is traveling on a road adjacent to a pavement and the second support target is present ahead of the first support target on the pavement, calculate a contact risk value of contact occurring due to the second support target running out into the road on the basis of the recognition information; and a specifier configured to, in a case where the contact risk value exceeds a predetermined threshold, set the risk notification by the first notification device and the second notification device to ON. The contact risk value calculator calculates the contact risk value on the basis of the number of pedestrians present in the vicinity of the second support target on the pavement.

(1) In the traffic safety support system according to the present invention, the risk notification specifier includes a contact risk value calculator configured to, in a case where a support target that is a mobile body is traveling on a road adjacent to a pavement and a first pedestrian is present ahead of the support target on the pavement, calculate a contact risk value on the road between the first pedestrian and the support target on the basis of recognition information, and a specifier configured to, in a case where the contact risk value exceeds a threshold, set ON of risk notification. Here, in a case where there are other pedestrians near the pedestrian moving on the pavement, the pedestrian tries to move while avoiding the other pedestrians, and thus, the number of pedestrians present in the vicinity of the first pedestrian on the pavement correlates with a possibility that the first pedestrian runs out into the road and comes into contact with the support target. Thus, in the present invention, the contact risk value calculator calculates the contact risk value on the basis of the number of pedestrians present in the vicinity of the first pedestrian on the pavement. By this means, the driver of the support target can recognize presence of such a risk through the risk notification before the pedestrian actually runs out into the road, so that it is possible to prevent contact between the support target and the first pedestrian on the road. Thus, according to the present invention, it is possible to improve safety, convenience and smoothness of traffic for mobile bodies traveling on a road and pedestrians moving on a pavement adjacent to the road.

(2) In the present invention, the contact risk value calculator calculates the contact risk value on the basis of whether or not a first predicted movement route of the first pedestrian intersects with a second predicted movement route of a second pedestrian. If the two movement routes intersect on the pavement, there is a possibility that one of the pedestrians may run out into the road to avoid each other. According to the present invention, such a potential risk can be appropriately grasped, so that it is possible to prevent contact between the support target and the first or the second pedestrian on the road. Thus, according to the present invention, it is possible to improve safety, convenience and smoothness of traffic by mobile bodies traveling on a road and pedestrians moving on a pavement adjacent to the road.

(3) In the present invention, the contact risk calculator calculates the contact risk value on the basis of both or one of a first pavement width occupancy of the first pedestrian and a second pavement width occupancy of the second pedestrian. As the pavement width occupancy on the pavement increases, a possibility that one of the pedestrians may run out into the road when passing each other increases. Thus, according to the present invention, by calculating the contact risk value on the basis of these pavement width occupancies, a timing for turning ON the risk notification can be appropriately determined.

(4) In the present invention, in a case where a predicted traveling route of the support target intersects with neither the first predicted movement route nor the second predicted movement route on the road, and the contact risk value exceeds a threshold, a first mode is set as the notification mode. By this means, by making the risk notification in the first mode in a situation where a risk that one of the first and the second pedestrians may run out into the road potentially exists, it is possible to cause the driver of the support target to recognize presence of a potential contact risk. Further, in the present invention, in a case where the predicted traveling route of the support target intersects with one of the first and the second predicted movement routes on the road, that is, in a case where a contact risk of the support target and one of the first and the second pedestrians on the road becomes apparent, the risk notification is made after a second mode with a higher notification intensity than the first mode is set as the notification mode. By this means, by strongly inviting attention of the driver of the support target, it is possible to cause the driver to perform action for avoiding the contact risk.

(5) The contact risk value calculator estimates a position of a predicted point at which one of the first and the second pedestrians moves from the pavement to the road on the basis of the first predicted movement route and the second predicted movement route and calculates the contact risk value on the basis of the position of the predicted point. By this means, it is possible to set ON of the risk notification at an appropriate timing in view of the point at which one of the first and the second pedestrians is predicted to move from the pavement to the road.

(6) In the traffic safety support system according to the present invention, the risk notification specifier includes a contact risk value calculator configured to, in a case where a first support target that is a mobile body is traveling on a road adjacent to a pavement and a second support target that is a pedestrian is present ahead of the first support target on the pavement, calculate a contact risk value on the road between the first support target and the second support target on the basis of recognition information and a specifier configured to, in a case where the contact risk value exceeds a threshold, set ON of risk notification by the first and the second notification devices of the first and the second support targets. Here, in a case where other pedestrians are present near the pedestrian who moves on the pavement, the pedestrian tries to move while avoiding the other pedestrians, and thus, the number of other pedestrians present in the vicinity of the second support target on the pavement correlates with a possibility that the second support target may run out into the road and come into contact with the first support target on the road. Thus, in the present invention, the contact risk value calculator calculates the contact risk value on the basis of the number of pedestrians present in the vicinity of the second support target on the pavement, and the specifier sets ON of the risk notification by the first and the second notification devices in a case where the contact risk value exceeds a threshold. By this means, the second support target can recognize presence of the first support target traveling on the road through the risk notification by the second notification device, so that the second support target can avoid other pedestrians while paying attention so as not to run out into the road. Further, the first support target can recognize presence of the second support target who is likely to move from the pavement to the road through the risk notification by the first notification device, so that the first support target can travel on the road while paying attention so as not to come into contact with the second support target on the road when traveling near the second support target. Thus, according to the present invention, the driver of the first support target that travels on the road and the second support target that moves on the pavement can recognize presence of each other, so that it is possible to prevent contact between the first support target and the second support target on the road. Thus, according to the present invention, it is possible to improve safety, convenience and smoothness of traffic by mobile bodies traveling on a road and pedestrians moving on a pavement adjacent to the road.

BRIEF DESCRIPTION OF THE DRAWINGS

FIG. 2 is a block diagram illustrating a configuration of a coordination support device and a plurality of area terminals connected to the coordination support device so as to be able to perform communication;

FIG. 3A is a block diagram illustrating a configuration of a notification device mounted on a four-wheeled vehicle;

FIG. 3C is a block diagram illustrating a configuration of a notification device mounted on a portable information processing terminal possessed by a pedestrian;

FIG. 5B is a flowchart illustrating procedure of setting the operation manner of the risk notification of the first support target that is traveling on the road along the pavement.

DETAILED DESCRIPTION OF THE INVENTION

A traffic safety support system according to one embodiment of the present invention will be described below with reference to the drawings.

Figure 1:
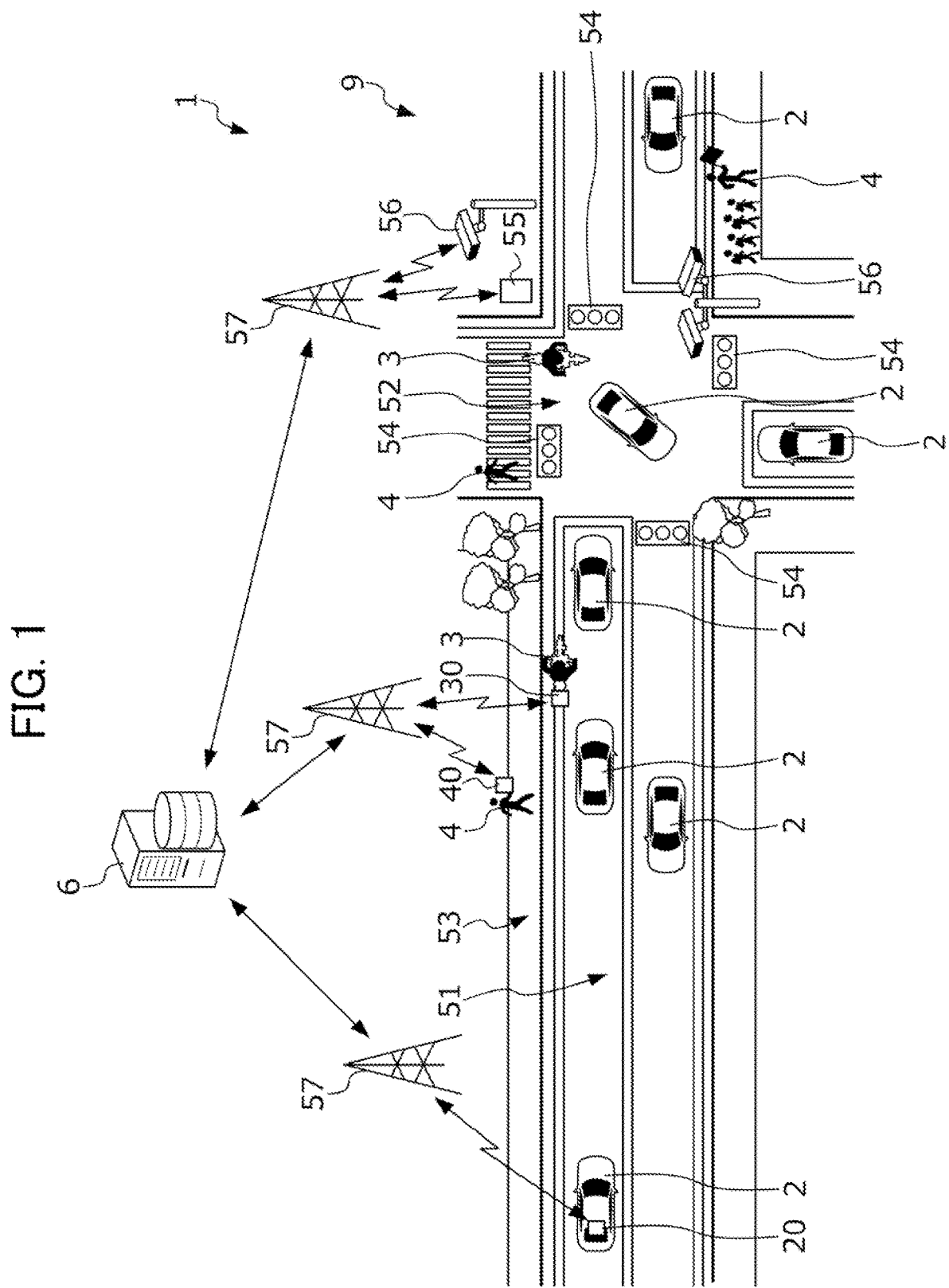
FIG. 1 is a view illustrating a configuration of a traffic safety support system according to one embodiment of the present invention and part of a target traffic area to be supported by the traffic safety support system.

FIG. 1 is a view schematically illustrating a configuration of a traffic safety support system 1 according to the present embodiment and part of a target traffic area 9 in which traffic participants to be supported by the traffic safety support system 1 are present.

The traffic safety support system 1 supports safe and smooth traffic of traffic participants in the target traffic area 9 by recognizing pedestrians 4 that are persons moving in the target traffic area 9 and four-wheeled vehicles 2, motorcycles 3, and the like, that are mobile bodies as individual traffic participants, notifying each traffic participant of support information generated through the recognition to encourage communication (specifically, for example, mutual recognition between the traffic participants) between the traffic participants that move in accordance with their individual intentions and recognition of a surrounding traffic environment.

FIG. 1 illustrates a case where an area around an intersection 52 in an urban area, including a road 51, the intersection 52, a pavement 53 and traffic lights 54 as traffic infrastructure equipment is set as the target traffic area 9. FIG. 1 illustrates a case where a total of seven four-wheeled vehicles 2 and a total of two motorcycles 3 move on the road 51 and at the intersection 52 and a total of three sets of pedestrians 4 move on the pavement 53 and at the intersection 52. Further, FIG. 1 illustrates a case where a total of three infrastructure cameras 56 are provided.

The traffic safety support system 1 includes on-board equipment 20 (including on-board devices mounted on the four-wheeled vehicles 2 and portable information processing terminals possessed or worn by drivers who drive the four-wheeled vehicles 2) that moves along with individual four-wheeled vehicles 2, on-board equipment 30 (including on-board devices mounted on the motorcycles 3 and portable information processing terminals possessed or worn by drivers who drive the motorcycles 3) that moves along with individual motorcycles 3, portable information processing terminals 40 possessed or worn by the respective pedestrians 4, a plurality of the infrastructure cameras 56 provided in the target traffic area 9, a traffic light control device 55 that controls the traffic lights 54, and a coordination support device 6 connected to a plurality of terminals (hereinafter, also simply referred to as "area terminals") such as these on-board equipment 20 and 30, the portable information processing terminals 40, the infrastructure cameras 56 and the traffic light control device 55 present in the target traffic area 9 so as to be able to perform communication.

The coordination support device 6 includes one or more computers connected to the above-described plurality of area terminals via a base station 57 so as to be able to perform communication. More specifically, the coordination support device 6 includes a server connected to the plurality of area terminals via the base station 57, a network core and the Internet, an edge server connected to the plurality of area terminals via the base station 57 and an MEC (multi-access edge computing) core, and the like.

FIG. 2 is a block diagram illustrating a configuration of the coordination support device 6 and a plurality of area terminals connected to the coordination support device 6 so as to be able to perform communication.

The on-board equipment 20 mounted on the four-wheeled vehicles 2 in the target traffic area 9 includes, for example, an on-board driving support device 21 that supports driving by a driver, a notification device 22 that notifies the driver of various kinds of information, a driving subject state sensor 23 that detects a state of the driver engaged in driving, an on-board communication device 24 that performs wireless communication between the own vehicle and the coordination support device 6 and other vehicles near the own vehicle, a portable information processing terminal 25 possessed or worn by the driver, and the like.

The on-board driving support device 21 includes an external sensor, an own vehicle state sensor, a navigation device, a driving support ECU, and the like. The external sensor includes an exterior camera that captures an image around the own vehicle, a plurality of on-board external sensors mounted on the own vehicle, such as a radar and a LIDAR (light detection and ranging) that detects a target outside the vehicle using an electromagnetic wave, and an outside recognition device that acquires information regarding a state around the own vehicle by performing sensor fusion processing on detection results from these on-board external sensors. The own vehicle state sensor includes a sensor that acquires information regarding a traveling state of the own vehicle, such as a vehicle speed sensor, an acceleration sensor, a steering angle sensor, a yaw rate sensor, a position sensor and an orientation sensor. The navigation device includes, for example, a GNSS receiver that specifies a current position of the own vehicle on the basis of a signal received from a GNSS (global navigation satellite system) satellite, a storage device that stores map information, and the like.

The driving support ECU executes driving support control such as lane departure prevention control, lane change control, preceding vehicle following control, erroneous start prevention control, collision mitigation brake control and collision avoidance control on the basis of the information acquired by the external sensor, the own vehicle state sensor, the navigation device, and the like. Further, the driving support ECU generates driving support information for supporting safe driving by the driver on the basis of the information acquired by the external sensor, the own vehicle state sensor, the navigation device, and the like, and transmits the driving support information to the notification device 22.

Here, the driving support ECU starts collision mitigation brake control of automatically operating a control device of the own vehicle so as to reduce damage by contact of the own vehicle and another mobile body on condition that there is a mobile body that may come into contact with the own vehicle within a predetermined collision mitigation brake actuation range around the own vehicle. Further, the driving support ECU starts collision avoidance control of automatically operating a steering device of the own vehicle to avoid contact of the own vehicle and another mobile body on condition that there is a mobile body that may come into contact with the own vehicle within a predetermined collision avoidance steering operation range around the own vehicle. In the following description, the collision mitigation brake actuation range and the collision avoidance steering operation range will be also collectively referred to as an "ADAS actuation range".

The driving subject state sensor 23 includes various devices that acquire time-series data of information correlated with driving capability of the driver engaged in driving. The driving subject state sensor 23 includes, for example, an on-board camera that detects a direction of a line of sight of the driver engaged in driving, whether or not the driver opens his/her eyes, and the like, a seat belt sensor that is provided at a seat belt to be fastened by the driver and detects a pulse of the driver, whether or not the driver breathes, and the like, a steering sensor that is provided at a steering to be gripped by the driver and detects a skin potential of the driver, and an on-board microphone that detects whether or not there is conversation between the driver and passengers.

The on-board communication device 24 has a function of transmitting the information acquired by the driving support ECU (including the information acquired by the external sensor, the own vehicle state sensor, the navigation device, and the like, control information regarding driving support control that is being executed, and the like), the information regarding the driving subject acquired by the driving subject state sensor 23, and the like, to the coordination support device 6, and a function of receiving coordination support information transmitted from the coordination support device 6 and transmitting the received coordination support information to the notification device 22.

The notification device 22 includes various devices that notify the driver of various kinds of information through auditory sense, visual sense, haptic sense, and the like, by causing a human machine interface (hereinafter, abbreviated as an "HMI") to operate in a manner determined on the basis of the driving support information transmitted from the on-board driving support device 21 and the coordination support information transmitted from the coordination support device 6.

FIG. 3A is a block diagram illustrating a configuration of the notification device 22 mounted on a four-wheeled vehicle. Note that FIG. 3A illustrates, within the notification device 22, only blocks particularly regarding control based on the coordination support information transmitted from the coordination support device 6.

The notification device 22 includes an HMI 220 that operates in a manner recognizable by the driver, and an HMI control device 225 that causes the HMI 220 to operate on the basis of the coordination support information transmitted from the coordination support device 6.

The HMI 220 includes an acoustic device 221 that operates in a manner auditorily recognizable by the driver, a head-up display 222 that operates in a manner visually recognizable by the driver, and a seat belt control device 223 and a seat vibration device 224 that operates in a manner haptically recognizable by the driver.

The acoustic device 221 includes a headrest speaker 221a that is provided at a headrest of a driver's seat to be seated by the driver and capable of emitting binaural sound having directivity, and a main speaker 221b that is provided in the vicinity of the driver's seat and a passenger's seat. The headrest speaker 221a and the main speaker 221b emit sound in accordance with a command from the HMI control device 225. The head-up display 222 displays an image in accordance with a command from the HMI control device 225 within a field of view (for example, a windshield) of the driver engaged in driving. The seat belt control device 223 changes tension of the seat belt to be fastened by the driver in accordance with a command from the HMI control device 225. The seat vibration device 224 vibrates the seat to be seated by the driver at an amplitude and/or a frequency in accordance with a command from the HMI control device 225.

The HMI control device 225 includes a soundness-promoting control device 226 configured to provide a soundness-promoting notification for causing the HMI 220 to operate in a manner determined for bringing driving capability (particularly, cognitive capability) of the driver in a sound state, and a risk notification control device 227 configured to make a risk notification for causing the HMI 220 to operate in a manner determined for causing the driver to recognize presence of a risk that comes near. As will be described later, the coordination support information to be transmitted from the coordination support device 6 to the four-wheeled vehicle 2 includes information regarding a soundness-promoting notification set value for setting ON/OFF of soundness-promoting notification by the soundness-promoting control device 226, information regarding a risk notification set value for setting ON/OFF of the risk notification by the risk notification control device 227 or a type of a notification mode which will be described later, information (hereinafter, also referred to as "risk information") regarding a risk that comes near to the driver, and the like.

The soundness-promoting notification set value to be input to the soundness-promoting control device 226 is set at one of "0" for setting OFF of the soundness-promoting notification by the soundness-promoting control device 226 and "1" for setting ON of the soundness-promoting notification by the soundness-promoting control device 226.

In a case where the soundness-promoting notification set value is "0", the soundness-promoting control device 226 sets OFF of the soundness-promoting notification. In other words, in a case where the soundness-promoting notification set value is "0", the soundness-promoting control device 226 does not cause the HMI 220 to operate. Note that this does not inhibit operation of the HMI 220 by the risk notification control device 227.

In a case where the soundness-promoting notification set value is "1", the soundness-promoting control device 226 sets ON of the soundness-promoting notification. More specifically, the soundness-promoting control device 226 brings driving capability of the driver in to a sound state by, for example, playing music that attracts interest and attention of the driver using the headrest speaker 221a or the main speaker 221b. Note that in this event, to increase a degree of awareness of the driver, beats per minute (BPM) of the music may be changed, or a bass tone may be emphasized.

In this manner, the soundness-promoting control device 226 causes the HMI 220 to operate to bring driving capability of the driver into a sound state, and thus, in a case where the risk notification is set ON by the risk notification control device 227 which will be described later (that is, in a case where the risk notification set value is "1" or "2"), the soundness-promoting notification may be set OFF so that the driver will not be annoyed. Further, while in the present embodiment, a case will be described where the soundness-promoting control device 226 brings driving capability into a sound state mainly via auditory sense of the driver by causing the headrest speaker 221a or the main speaker 221b to operate, the present invention is not limited to this. The soundness-promoting control device 226 may, for example, cause the seat belt control device 223 or the seat vibration device 224 to operate.

The risk notification control device 227 can make a risk notification in a plurality of notification modes in which at least one of a device to be caused to operate among those of the HMI 220 or an operation manner is different. More specifically, the risk notification control device 227 can make a risk notification in at least one of a hinting notification mode intended to cause the driver to recognize presence of a potential risk, an analogue notification mode intended to cause the driver to recognize presence of a visible risk and/or a level of the risk, or a prediction-assisted notification mode intended to notify the driver of information useful for avoiding a predicted risk. Thus, as the risk notification set value to be input to the risk notification control device 227, one of "0" for setting OFF of risk notification, "1" for setting ON of risk notification in the hinting notification mode, "2" for setting ON of risk notification in the analogue notification mode, "3" for setting ON of risk notification in the prediction-assisted notification mode, "4" for setting ON of risk notification in the hinting notification mode and the prediction-assisted notification mode, and "5" for setting ON of risk notification in the analogue notification mode and the prediction-assisted notification mode is set.

In a case where the risk notification set value is "0", the risk notification control device 227 sets OFF of risk notification. In other words, in a case where the risk notification set value is "0", the risk notification control device 227 does not cause the HMI 220 to operate. Note that this does not inhibit operation of the HMI 220 by the soundness-promoting control device 226.

In a case where the risk notification set value is "1", the risk notification control device 227 sets the hinting notification mode as the notification mode and turns ON risk notification in the set notification mode.

In a case where the risk notification set value is "2", the risk notification control device 227 sets the analogue notification mode as the notification mode and turns ON risk notification in the set notification mode.

In a case where the risk notification set value is "3", the risk notification control device 227 sets the prediction-assisted notification mode as the notification mode and turns ON risk notification in the set notification mode.

In a case where the risk notification set value is "4", the risk notification control device 227 sets the hinting notification mode and the prediction-assisted notification mode as the notification modes and turns ON risk notification in these set notification modes.

Further, in a case where the risk notification set value is "5", the risk notification control device 227 sets the analogue notification mode and the prediction-assisted notification mode as the notification modes and turns ON risk notification in the set notification modes.

Here, in a case where the prediction-assisted notification mode is set as the notification mode, the risk notification control device 227 generates risk avoidance support information useful for avoiding a risk that comes near to the driver on the basis of the risk information transmitted from the coordination support device 6 and causes the acoustic device 221 and the head-up display 222 of the HMI 220 to operate in such a manner that enables the driver to auditorily and visually recognize the risk avoidance support information. Here, the risk avoidance support information includes information regarding a position of a traffic participant which may come into contact with the own vehicle (hereinafter, also referred to as a "risk-carrying subject"), information regarding a point at which the own vehicle may come into contact with the risk-carrying subject (hereinafter, also referred to as a "risk occurrence point"), and information including content that evokes attention of the driver to the risk-carrying subject.

More specifically, in a case where there is a motorcycle driven by an unsound rider ahead of the four-wheeled vehicle driven by the driver, the risk notification control device 227 emits a message having content of "Be careful of dangerous right-turn of the motorcycle" by the acoustic device 221 or displays the message on the head-up display 222 as the risk avoidance support information for avoiding contact with the motorcycle. Further, in this event, the risk notification control device 227 may display an image of an arrow indicating a current position or a predicted position of the motorcycle on the head-up display 222 as the risk avoidance support information for avoiding contact with the motorcycle.

Still further, in a case where the hinting notification mode is set as the notification mode, the risk notification control device 227 causes the driver to spontaneously recognize presence of a risk-carrying subject extracted from the risk information transmitted from the coordination support device 6 by causing the HMI 220 to operate in such a manner as not to annoy the driver. In such a hinting notification mode, in order to cause the driver to spontaneously recognize presence of a risk-carrying subject without annoying the driver, the risk notification control device 227 preferably causes the headrest speaker 221a that particularly appeals to auditory sense of the driver among the plurality of devices included in the HMI 220. More specifically, in a case where the hinting notification mode is set as the notification mode, the risk notification control device 227 spontaneously brings the line of sight of the driver to a position of the risk-carrying subject or a risk occurrence point by causing the headrest speaker 221a to emit a familiar sound effect with binaural sound having directivity directed to the position of the risk-carrying subject or the risk occurrence point at small volume.

Further, in a case where the analogue notification mode is set as the notification mode, the risk notification control device 227 causes the driver to strongly recognize presence of the risk-carrying subject extracted from the risk information transmitted from the coordination support device 6 and a level of the risk by the risk-carrying subject by causing the HMI 220 to operate in a manner different from the hinting notification mode described above. In this manner, in the analogue notification mode, to cause the driver to strongly recognize presence of the risk-carrying subject, the risk notification control device 227 causes the HMI 220 to operate in a manner with higher notification intensity than notification intensity of the manner set in the hinting notification mode. Here, the notification intensity refers to intensity of attracting concern and attention of the driver. More specifically, in a case where the analogue notification mode is set as the notification mode, the risk notification control device 227 causes the headrest speaker 221a and the main speaker 221b to emit buzzer sound or pulse sound at larger volume than the volume of the sound effect emitted in the hinting notification mode. The buzzer sound and the pulse sound are unfamiliar high-volume sound for the driver compared to the sound effect emitted in the hinting notification mode, and thus, the notification intensity is higher than the notification intensity of the sound effect emitted in the hinting notification mode.

Note that while in the present embodiment, a case will be described where the risk notification control device 227 causes the acoustic device 221 to operate in a case where the analogue notification mode is set as the notification mode, the present invention is not limited to this. In a case where the analogue notification mode is set as the notification mode, the risk notification control device 227 may cause the seat belt control device 223 to operate to change tension of the seat belt or cause the seat vibration device 224 to operate to vibrate the seat instead of causing the acoustic device 221 to operate. In this manner, the seat belt control device 223 and the seat vibration device 224 operate in a manner that appeals to haptic sense of the driver, and thus, the notification intensity is higher than the notification intensity of the sound effect emitted in the hinting notification mode. Further, in a case where the analogue notification mode is set as the notification mode, the risk notification control device 227 may cause the acoustic device 221, the seat belt control device 223 and the seat vibration device 224 to operate in combination.

Further, as described above, in the analogue notification mode, to cause the driver to strongly recognize a level of the risk by the risk-carrying subject in addition to presence of the risk-carrying subject, the risk notification control device 227 preferably changes the notification intensity in accordance with the level of the risk by the risk-carrying subject (e.g., the length of a predicted period until a possible collision with the risk-carrying subject) extracted from the risk information transmitted from the coordination support device 6. Specifically, the risk notification control device 227 may increase the notification intensity by increasing a volume of the buzzer sound, increasing a volume of the pulse sound or shortening an interval of the pulse sound as the level of the risk becomes higher (i.e., as the predicted period until the possible collision with the risk-carrying subject shortens). In a case where the seat belt control device 223 is caused to operate as described above, the risk notification control device 227 may increase the notification intensity by increasing tension of the seat belt as the level of the risk becomes higher. Further, in a case where the seat vibration device 224 is caused to operate as described above, the risk notification control device 227 may increase the notification intensity by increasing an amplitude of vibration of the seat as the level of the risk becomes higher.

Further, in a case where the notification intensity is changed in accordance with the level of the risk in this manner, the risk notification control device 227 preferably causes the HMI 220 to operate so that the notification intensity becomes maximum at a time point at which execution of the collision mitigation brake control and the collision avoidance steering control is started by the driving support ECU described above, in other words, at a time point at which the risk-carrying subject enters the ADAS actuation range of the own vehicle.

Returning to FIG. 2, the portable information processing terminal 25 includes, for example, a wearable terminal to be worn by the driver of the four-wheeled vehicle 2, a smartphone possessed by the driver, and the like. The wearable terminal has a function of measuring biological information of the driver such as a heart rate, a blood pressure and a blood oxygen level and transmitting the measurement data of the biological information to the coordination support device 6 and a function of receiving the coordination support information transmitted from the coordination support device 6 and notifying the driver of a message in accordance with the coordination support information with an image, speech, warning sound, vibration, and the like. Further, the smartphone has a function of transmitting information regarding the driver such as position information, travel acceleration and schedule information of the driver to the coordination support device 6 and a function of receiving the coordination support information transmitted from the coordination support device 6 and notifying the driver of a message in accordance with the coordination support information with an image, speech, warning sound, melody, vibration, and the like.

The on-board equipment 30 mounted on the motorcycles 3 in the target traffic area 9 includes, for example, an on-board driving support device 31 that supports driving by a rider, a notification device 32 that notifies the rider of various kinds of information, a rider state sensor 33 that detects a state of the rider engaged in driving, an on-board communication device 34 that performs wireless communication between the own vehicle, and the coordination support device 6 and other vehicles near the own vehicle, a portable information processing terminal 35 possessed or worn by the rider, and the like.

The on-board driving support device 31 includes an external sensor, an own vehicle state sensor, a navigation device, a driving support ECU, and the like. The external sensor includes an exterior camera that captures an image around the own vehicle, a plurality of on-board external sensors mounted on the own vehicle such as a radar and a LIDAR that detects a target outside the vehicle by using an electromagnetic wave, and an outside recognition device that acquires information regarding a state around the own vehicle by performing fusion processing on detection results from the on-board exterior sensors. The own vehicle state sensor includes sensors that acquire information regarding a traveling state of the own vehicle such as a vehicle speed sensor and a five-axis or six-axis inertial measurement device. The navigation device includes, for example, a GNSS receiver that specifies a current position on the basis of a signal received from a GNSS satellite, a storage device that stores map information, and the like.

The driving support ECU executes driving support control such as lane keeping control, lane departure prevention control, lane change control, preceding vehicle following control, erroneous start prevention control and collision mitigation brake control on the basis of the information acquired by the external sensor, the own vehicle state sensor, the navigation device, and the like. Further, the driving support ECU generates driving support information for supporting safe driving by the rider on the basis of the information acquired by the external sensor, the own vehicle state sensor, the navigation device, and the like, and transmits the driving support information to the notification device 32.

Here, the driving support ECU starts collision mitigation brake control of automatically operating a brake device of the own vehicle to reduce damage by contact of the own vehicle and another mobile body on condition that there is a mobile body that may come into contact with the own vehicle within a predetermined collision mitigation brake actuation range (hereinafter, also referred to as an "ADAS actuation range" which is also used for a term defined for the four-wheeled vehicle 2) around the own vehicle.

The rider state sensor 33 includes various devices that acquire information correlated with driving capability of the rider engaged in driving. The rider state sensor 33 includes, for example, a seat sensor that is provided at a seat to be seated by the rider and detects a pulse, whether or not the rider breathes, and the like, a helmet sensor that is provided at a helmet to be worn by the rider and detects a pulse of the rider, whether or not the rider breathes, a skin potential, and the like.

The on-board communication device 34 has a function of transmitting the information acquired by the driving support ECU (including the information acquired by the external sensor, the own vehicle state sensor, the navigation device, and the like, and control information regarding driving support control that is being executed), information regarding the rider acquired by the rider state sensor 33, and the like, to the coordination support device 6 and a function of receiving the coordination support information transmitted from the coordination support device 6 and transmitting the received coordination support information to the notification device 32.

The notification device 32 includes various devices that notifies the rider of various kinds of information through auditory sense, visual sense, haptic sense, and the like, by causing the HMI to operate in a manner determined on the basis of the driving support information transmitted from the on-board driving support device 21 and the coordination support information transmitted from the coordination support device 6.

Figure 3B:
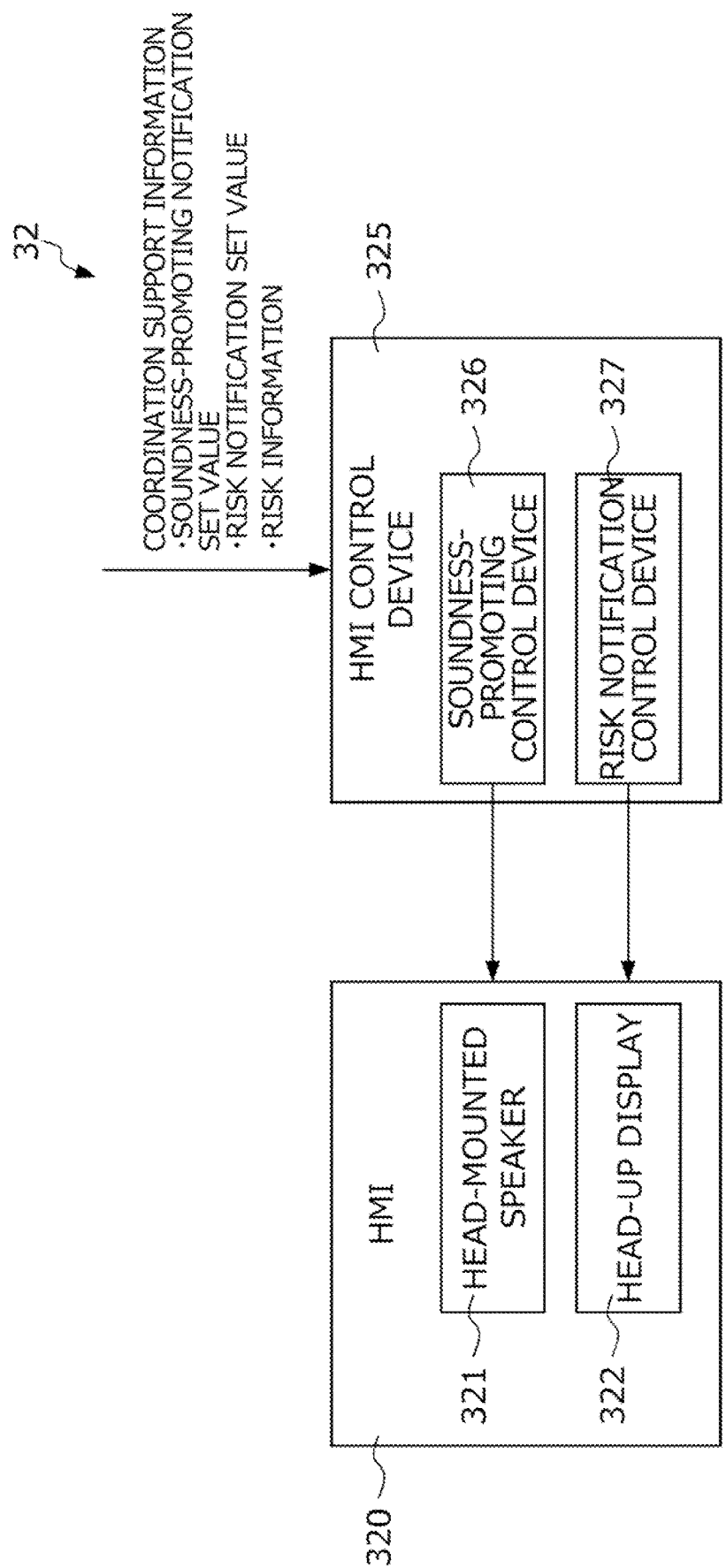
FIG. 3B is a block diagram illustrating a configuration of a notification device mounted on a motorcycle.

FIG. 3B is a block diagram illustrating a configuration of the notification device 32 mounted on the motorcycle. Note that FIG. 3B illustrates, within the notification device 32, only blocks particularly regarding control based on the coordination support information transmitted from the coordination support device 6.

The notification device 32 includes an HMI 320 that operates in a manner recognizable by the rider, and an HMI control device 325 that causes the HMI 320 to operate on the basis of the coordination support information transmitted from the coordination support device 6.

The HMI 320 includes a head-mounted speaker 321 that operates in a manner auditorily recognizable by the rider, and a head-up display 322 that operates in a manner visually recognizable by the rider.

The head-mounted speaker 321 is provided at a helmet to be worn by the rider and is capable of emitting binaural sound having directivity. The head-mounted speaker 321 emits sound in accordance with a command from the HMI control device 325. The head-up display 322 displays an image in accordance with a command from the HMI control device 325 within a field of view (for example, a shield of the helmet) of the rider engaged in driving.

The HMI control device 325 includes a soundness-promoting control device 326 configured to make a soundness-promoting notification for causing the HMI 320 to operate in a manner determined for bringing driving capability (particularly, cognitive capability) of the rider into a sound state, and a risk notification control device 327 configured to make a risk notification for causing the HMI 320 to operate in a manner determined for causing the rider to recognize presence of a risk that comes near. As will be described later, the coordination support information to be transmitted from the coordination support device 6 to the motorcycle 3 includes information regarding a soundness-promoting notification set value for setting ON/OFF of soundness-promoting notification by the soundness-promoting control device 326, information regarding a risk notification set value for setting ON/OFF of risk notification by the risk notification control device 327 and a type of the notification mode, risk information regarding a risk that comes near to the rider, and the like.

The soundness-promoting notification set value to be input to the soundness-promoting control device 326 is set at one of "0" for setting OFF of the soundness-promoting notification by the soundness-promoting control device 326 and "1" for setting ON of the soundness-promoting notification by the soundness-promoting control device 326.

In a case where the soundness-promoting notification set value is "0", the soundness-promoting control device 326 sets OFF of the soundness-promoting notification. In other words, in a case where the soundness-promoting notification set value is "0", the soundness-promoting control device 326 does not cause the HMI 320 to operate. Note that this does not inhibit operation of the HMI 320 by the risk notification control device 327.

In a case where the soundness-promoting notification set value is "1", the soundness-promoting control device 326 sets ON of the soundness-promoting notification. More specifically, the soundness-promoting control device 326 brings driving capability of the rider into a sound state by playing music that attracts interest or attention of the rider using, for example, the head-mounted speaker 321. Note that in this event, to increase a degree of awareness of the rider, BPM of the music may be changed, or a bass tone may be emphasized.

In this manner, the soundness-promoting control device 326 causes the HMI 320 to operate to bring the driving capability of the rider into a sound state, and thus, in a case where the risk notification by the risk notification control device 327 which will be described later is set ON (that is, in a case where the risk notification set value is "1" or "2"), the soundness-promoting notification may be set OFF so that the driver will not be annoyed.

The risk notification control device 327 can make a risk notification in a plurality of notification modes in which at least one of a device to be caused to operate among those of the HMI 320 or an operation manner is different. More specifically, the risk notification control device 327 can make a risk notification in at least one of a hinting notification mode intended to cause the rider to recognize existence of a potential risk, an analogue notification mode intended to cause the rider to recognize existence of a visible risk and/or a level of the risk, or a prediction-assisted notification mode intended to notify the rider of information useful for avoiding a predicted risk. Thus, as the risk notification set value to be input to the risk notification control device 327, one of "0" for setting OFF of risk notification, "1" for setting ON of risk notification in the hinting notification mode, "2" for setting ON of risk notification in the analogue notification mode, "3" for setting ON of risk notification in the prediction-assisted notification mode, "4" for setting ON of risk notification in the hinting notification mode and the prediction-assisted notification mode, and "5" for setting ON of risk notification in the analogue notification mode and the prediction-assisted notification mode is set.

In a case where the risk notification set value is "0", the risk notification control device 327 sets OFF of risk notification. In other words, in a case where the risk notification set value is "0", the risk notification control device 327 does not cause the HMI 320 to operate. Note that this does not inhibit operation of the HMI 320 by the soundness-promoting control device 326.

In a case where the risk notification set value is "1", the risk notification control device 327 sets the hinting notification mode as the notification mode and turns ON risk notification in the set notification mode.

In a case where the risk notification set value is "2", the risk notification control device 327 sets the analogue notification mode as the notification mode and turns ON risk notification in the set notification mode.

In a case where the risk notification set value is "3", the risk notification control device 327 sets the prediction-assisted notification mode as the notification mode and turns ON risk notification in the set notification mode.

In a case where the risk notification set value is "4", the risk notification control device 327 sets the hinting notification mode and the prediction-assisted notification mode as the notification modes and turns ON risk notification in the set notification modes.

In a case where the risk notification set value is "5", the risk notification control device 327 sets the analogue notification mode and the prediction-assisted notification mode as the notification modes and turns ON risk notification in the set notification modes.

Here, in a case where the prediction-assisted notification mode is set as the notification mode, the risk notification control device 327 generates risk avoidance support information useful for avoiding a risk that comes near to the rider on the basis of the risk information transmitted from the coordination support device 6 and causes the head-mounted speaker 321 and the head-up display 322 of the HMI 320 to operate in such a manner that enables the rider to visually and auditorily recognize the risk avoidance support information. Here, the risk avoidance support information includes information regarding a position of a risk-carrying subject that may come into contact with the own vehicle, information regarding a risk occurrence point and information including content that evokes attention of the rider to the risk-carrying subject.

More specifically, in a case where there is a four-wheeled vehicle driven by an unsound driver ahead of the motorcycle driven by the rider, the risk notification control device 327 causes the head-mounted speaker 321 to emit a message indicating content of "Be careful of dangerous right-turn of the four-wheeled vehicle" or causes the head-up display 322 to display the message as the risk avoidance support information for avoiding contact with the four-wheeled vehicle. Further, in this event, the risk notification control device 327 may cause the head-up display 322 to display an image of an arrow indicating a current position or a predicted position of the four-wheeled vehicle as the risk avoidance support information for avoiding contact with the four-wheeled vehicle.

Further, in a case where the hinting notification mode is set as the notification mode, the risk notification control device 327 causes the rider to spontaneously recognize presence of a risk-carrying subject extracted from the risk information transmitted from the coordination support device 6 by causing the HMI 320 to operate in such a manner as not to annoy the driver. In such a hinting notification mode, to cause the rider to spontaneously recognize presence of the risk-carrying subject without annoying the driver, the risk notification control device 327 preferably causes particularly the head-mounted speaker 321 that appeals to auditory sense of the rider to operate among the plurality of devices included in the HMI 320. More specifically, in a case where the hinting notification mode is set as the notification mode, the risk notification control device 327 spontaneously brings the line of sight of the rider to a position of the risk-carrying subject or the risk occurrence point by causing the head-mounted speaker 321 to emit low-volume familiar sound effect with binaural sound having directivity directed to the position of the risk-carrying subject or the risk occurrence point.

In a case where the analogue notification mode is set as the notification mode, the risk notification control device 327 causes the rider to strongly recognize presence of the risk-carrying subject extracted from the risk information transmitted from the coordination support device 6 and a level of the risk by the risk-carrying subject by causing the HMI 320 to operate in a manner different from the hinting notification mode described above. In this manner, in the analogue notification mode, to cause the rider to strongly recognize presence of the risk-carrying subject, the HMI control device 325 causes the HMI 320 to operate in a manner with notification intensity higher than notification intensity in a manner set in the hinting notification mode. More specifically, in a case where the analogue notification mode is set as the notification mode, the risk notification control device 327 causes the head-mounted speaker 321 to emit buzzer sound or pulse sound at larger volume than a volume of the sound effect emitted in the hinting notification mode. The buzzer sound and the pulse sound are unfamiliar high-volume sound for the rider compared to the sound effect emitted in the hinting notification mode, and thus, the notification intensity is higher than the notification intensity of the sound effect emitted in the hinting notification mode.

Further, as described above, to cause the rider to strongly recognize the level of the risk by the risk-carrying subject in addition to presence of the risk-carrying subject, the risk notification control device 327 preferably changes the notification intensity in accordance with the level of the risk by the risk-carrying subject (e.g., the length of a predicted period until a possible collision with the risk-carrying subject) extracted from the risk information transmitted from the coordination support device 6. Specifically, the risk notification control device 327 may increase the notification intensity by increasing a volume of the buzzer sound, increasing a volume of the pulse sound or shortening an interval of the pulse sound as the level of the risk becomes higher (i.e., as the predicted period until the possible collision with the risk-carrying subject shortens).

Further, in a case where the notification intensity is changed in accordance with the level of the risk in this manner, the risk notification control device 327 preferably causes the HMI 320 to operate so that the notification intensity becomes maximum at a time point at which execution of collision mitigation brake control is started by the driving support ECU described above, in other words, at a time point at which the risk-carrying subject enters the ADAS actuation range.

Returning to FIG. 2, the portable information processing terminal 40 possessed or worn by the pedestrian 4 in the target traffic area 9 includes, for example, a wearable terminal to be worn by the pedestrian 4, a smartphone possessed by the pedestrian 4, and the like. The wearable terminal has a function of measuring biological information of the pedestrian 4 such as a heart rate, a blood pressure and a blood oxygen level and transmitting the measurement data of the biological information to the coordination support device 6 and receiving the coordination support information transmitted from the coordination support device 6. Further, the smartphone has a function of transmitting pedestrian information regarding the pedestrian 4 such as position information, travel acceleration, schedule information, and the like, of the pedestrian 4 to the coordination support device 6 and receiving the coordination support information transmitted from the coordination support device 6.

Further, the portable information processing terminal 40 includes a notification device 42 that notifies the pedestrian of various kinds of information through auditory sense, visual sense, haptic sense, and the like, of the pedestrian by causing the HMI to operate in a manner determined on the basis of the received coordination support information.

FIG. 3C is a block diagram illustrating a configuration of the notification device 42 mounted on the portable information processing terminal 40. Note that FIG. 3C illustrates, within the notification device 42, only blocks particularly regarding control based on the coordination support information transmitted from the coordination support device 6.

The notification device 42 includes an HMI 420 that operates in a manner recognizable by the pedestrian, and an HMI control device 425 that causes the HMI 420 to operate on the basis of the coordination support information transmitted from the coordination support device 6.

The HMI 420 includes a speaker 421 that operates in a manner auditorily recognizable by the pedestrian, and a vibration device 424 that operates in a manner haptically recognizable by the pedestrian.

The speaker 421 emits sound in accordance with a command from the HMI control device 425. The vibration device 424 vibrates a body of the portable information processing terminal 40 at an amplitude and/or a frequency in a manner in accordance with a command from the HMI control device 425.

As will be described later, the coordination support information transmitted from the coordination support device 6 to the portable information processing terminal 40 possessed by the pedestrian includes information regarding a risk notification set value for setting ON/OFF of risk notification and a type of the notification mode to be set by the HMI control device 425, risk information regarding a risk that comes near to the pedestrian, and the like.

The HMI control device 425 can make a risk notification in a plurality of notification modes in which at least one of a device to be caused to operate among those of the HMI 420 or an operation manner is different. More specifically, the HMI control device 425 can make a risk notification in at least one of a hinting notification mode intended to cause the pedestrian to recognize existence of a potential risk or an analogue notification mode intended to cause the pedestrian to recognize existence of a visible risk and/or a level of the risk. Thus, as the risk notification set value to be input to the HMI control device 425, one of "0" for setting OFF of risk notification by the HMI control device 425, "1" for setting ON of the risk notification by the HMI control device 425 and setting the hinting notification mode as the notification mode and "2" for setting ON of risk notification by the HMI control device 425 and setting the analogue notification mode as the notification mode is set.

In a case where the risk notification set value is "0", the HMI control device 425 sets OFF of risk notification. In other words, in a case where the risk notification set value is "0", the HMI control device 425 does not cause the HMI 420 to operate.

In a case where the risk notification set value is "1", the HMI control device 425 sets the hinting notification mode as the notification mode and turns ON risk notification in the set notification mode.

In a case where the risk notification set value is "2", the HMI control device 425 sets the analogue notification mode as the notification mode and turns ON risk notification in the set notification mode.

Here, the HMI control device 425 causes the pedestrian to spontaneously recognize presence of a risk-carrying subject extracted from the risk information transmitted from the coordination support device 6 by causing the HMI 420 to operate in such a manner as not to annoy the driver. More specifically, in a case where the hinting notification mode is set as the notification mode, the HMI control device 425 vibrates the body of the portable information processing terminal 40 at a predetermined amplitude and frequency by causing the vibration device 424 to operate.

Further, in a case where the analogue notification mode is set as the notification mode, the HMI control device 425 causes the pedestrian to strongly recognize presence of a risk-carrying subject extracted from the risk information transmitted from the coordination support device 6 and a level of risk by the risk-carrying subject by causing the HMI 420 to operate in a manner different from the hinting notification mode described above. In this manner, in the analogue notification mode, to cause the pedestrian to strongly recognize presence of the risk-carrying subject, the HMI control device 425 causes the HMI 420 to operate in a manner with notification intensity higher than notification intensity in a manner set in the hinting notification mode. More specifically, in a case where the analogue notification mode is set as the notification mode, the HMI control device 425 causes the speaker 421 to emit buzzer sound, pulse sound, a message indicating that there is a risk, or the like.

Further, as described above, in the analogue notification mode, to cause the pedestrian to strongly recognize a level of the risk by the risk-carrying subject in addition to presence of the risk-carrying subject, the HMI control device 425 preferably changes the notification intensity in accordance with the level of the risk by the risk-carrying subject (e.g., the length of a predicted period until a possible collision with the risk-carrying subject) extracted from the risk information transmitted from the coordination support device 6. Specifically, the HMI control device 425 may increase the notification intensity by increasing a volume of the buzzer sound, increasing a volume of the pulse sound, shortening an interval of the pulse sound, increasing a volume of the message or changing content of the message as the level of the risk becomes higher (i.e., as the predicted period until the possible collision with the risk-carrying subject shortens).

Returning to FIG. 2, the infrastructure camera 56 captures images of traffic infrastructure equipment including a road, an intersection and a pavement in a target traffic area and mobile bodies and pedestrians that move on the road, the intersection, the pavement, and the like, and transmits the obtained image information to the coordination support device 6.

The traffic light control device 55 controls the traffic lights and transmits traffic light state information regarding current lighting color of the traffic lights provided in the target traffic area, a timing at which the lighting color is switched, and the like, to the coordination support device 6.

The coordination support device 6 is a computer that supports safe and smooth traffic of the traffic participants in the target traffic area by generating coordination support information for encouraging communication between the traffic participants and recognition of a surrounding traffic environment for each traffic participant to be supported on the basis of the information acquired from a plurality of area terminals present in the target traffic area as described above and notifying each traffic participant. Note that in the present embodiment, traffic participants including means for receiving the coordination support information generated at the coordination support device 6 and causing the HMI to operate in a manner set on the basis of the received coordination support information (for example, the on-board equipment 20 and 30, the portable information processing terminal 40 and the notification devices 22, 32 and 42) among the plurality of traffic participants present in the target traffic area are set as targets to be supported by the coordination support device 6. In other words, both of the mobile body including the on-board equipment 20 and the notification device 22 or the on-board equipment 30 and the notification device 32, and the pedestrian including the portable information processing terminal 40 and the notification device 42 are support targets of the coordination support device 6.

The coordination support device 6 includes a target traffic area recognizer 60 configured to recognize persons and mobile bodies in the target traffic area as individual traffic participants, a driving subject information acquirer 61 configured to acquire driving subject state information correlated with driving capability of driving subjects of the mobile bodies recognized as the traffic participants by the target traffic area recognizer 60, a predictor 62 configured to predict future of the traffic participants in the target traffic area, a soundness-promoting notification specifier 63 configured to set ON/OFF of the soundness-promoting notification for each of the traffic participants recognized as support targets by the target traffic area recognizer 60, a risk notification specifier 64 configured to set a notification mode of the risk notification for each of the traffic participants recognized as the support targets by the target traffic area recognizer 60, a coordination support information notifier 65 configured to transmit coordination support information generated for each of the traffic participants recognized as the support targets by the target traffic area recognizer 60, a traffic environment database 67 in which information regarding traffic environments of the target traffic area is accumulated, and a driving history database 68 in which information regarding past driving history by the driving subjects registered in advance is accumulated.

In the traffic environment database 67, information regarding traffic environments of the traffic participants in the target traffic area such as map information of the target traffic area registered in advance (for example, a width of the road, the number of lanes, speed limit, a width of the pavement, whether or not there is a guardrail between the road and the pavement, a position of a crosswalk) and risk area information regarding a high risk area with a particularly high risk in the target traffic area, is stored. In the following description, the information stored in the traffic environment database 67 will be also referred to as registered traffic environment information.

In the driving history database 68, information regarding past driving history of the driving subjects registered in advance is stored in association with registration numbers of mobile bodies possessed by the driving subjects. Thus, if the registration numbers of the recognized mobile bodies can be specified by the target traffic area recognizer 60 which will be described later, the past driving history of the driving subjects of the recognized mobile bodies can be acquired by searching the driving history database 68 on the basis of the registration numbers. In the following description, the information stored in the driving history database 68 will also be referred to as registered driving history information.

In a pedestrian history database 69, information regarding movement history of a pedestrian on a pavement registered in advance is stored in association with a user ID of the pedestrian. Thus, if a user ID of the recognized pedestrian can be specified by the target traffic area recognizer 60 which will be described later, the pedestrian history database 69 can be acquired on the basis of the user ID. In the following description, the information stored in the pedestrian history database 69 will be also referred to as registered pedestrian movement history.

The target traffic area recognizer 60 recognizes traffic participants that are persons or mobile bodies in the target traffic area and recognition targets including traffic environments of the respective traffic participants in the target traffic area on the basis of the information transmitted from the above-described area terminal (the on-board equipment 20 and 30, the portable information processing terminal 40, the infrastructure camera 56 and the traffic light control device 55) in the target traffic area and the registered traffic environment information read from the traffic environment database 67 and acquires recognition information regarding the recognition targets.

Here, the information transmitted from the on-board driving support device 21 and the on-board communication device 24 included in the on-board equipment 20 to the target traffic area recognizer 60 and the information transmitted from the on-board driving support device 31 and the on-board communication device 34 included in the on-board equipment 30 to the target traffic area recognizer 60 include information regarding traffic participants present near the own vehicle and a state regarding the traffic environment acquired by the external sensor, information regarding a state of the own vehicle as one traffic participant acquired by the own vehicle state sensor, the navigation device and the like, and the like. Further, the information transmitted from the portable information processing terminal 40 to the target traffic area recognizer 60 includes information regarding a state of a pedestrian as one traffic participant, such as a position and travel acceleration. Still further, the image information transmitted from the infrastructure camera 56 to the target traffic area recognizer 60 includes information regarding the respective traffic participants and traffic environments of the traffic participants, such as appearance of the traffic infrastructure equipment such as the road, the intersection and the pavement, and appearance of traffic participants moving in the target traffic area. Further, the traffic light state information transmitted from the traffic light control device 55 to the target traffic area recognizer 60 includes information regarding traffic environments of the respective traffic participants such as current lighting color of the traffic lights and a timing for switching the lighting color. Further, the registered traffic environment information to be read by the target traffic area recognizer 60 from the traffic environment database 67 includes information regarding traffic environments of the respective traffic participants such as map information, the risk area information, and the like, of the target traffic area.

Thus, the target traffic area recognizer 60 can acquire recognition information of each traffic participant (hereinafter, also referred to as "traffic participant recognition information") such as a position of each traffic participant in the target traffic area, moving speed, moving acceleration, direction of movement, a vehicle type of the mobile body, a vehicle rank, registration number of the mobile body, the number of people of the pedestrian and an age group of the pedestrian on the basis of the information transmitted from the area terminals. Further, the target traffic area recognizer 60 can acquire recognition information of the traffic environment (hereinafter, also referred to as "traffic environment recognition information") of each traffic participant in the target traffic area such as a width of the road, the number of lanes, speed limit, a width of the pavement, whether or not there is a guardrail between the road and the pavement, lighting color of the traffic light, a switching timing of the lighting color, and the risk area information on the basis of the information transmitted from the area terminals.

Thus, in the present embodiment, the recognizer that recognizes the traffic participants in the target traffic area and the traffic environments includes the target traffic area recognizer 60, the on-board driving support device 21, the on-board communication device 24 and the portable information processing terminal 25 included in the on-board equipment 20 of the four-wheeled vehicle 2, the on-board driving support device 31, the on-board communication device 34 and the portable information processing terminal 35 included in the on-board equipment 30 of the motorcycle 3, the portable information processing terminal 40 of the pedestrian, the infrastructure camera 56, the traffic light control device 55 and the traffic environment database 67.

The target traffic area recognizer 60 transmits the traffic participant recognition information and the traffic environment recognition information acquired as described above to the driving subject information acquirer 61, the predictor 62, the soundness-promoting notification specifier 63, the risk notification specifier 64, the coordination support information notifier 65, and the like.

The driving subject information acquirer 61 acquires driving subject state information and driving subject characteristic information correlated with current driving capabilities of the driving subjects of the mobile bodies recognized as the traffic participants by the target traffic area recognizer 60 on the basis of the information transmitted from the above-described area terminals (particularly, the on-board equipment 20 and 30) in the target traffic area and the registered driving history information read from the driving history database 68.

More specifically, in a case where the driving subject of the four-wheeled vehicle recognized as the traffic participant by the target traffic area recognizer 60 is a person, the driving subject information acquirer 61 acquires the information transmitted from the on-board equipment 20 mounted on the four-wheeled vehicle as driving subject state information of the driver. Further, in a case where the driving subject of the motorcycle recognized as the traffic participant by the target traffic area recognizer 60 is a person, the driving subject information acquirer 61 acquires the information transmitted from the on-board equipment 30 mounted on the motorcycle as driving subject state information of the rider.

Here, the information to be transmitted from the driving subject state sensor 23 and the on-board communication device 24 included in the on-board equipment 20 to the driving subject information acquirer 61 includes time-series data regarding appearance information such as a direction of a line of sight of the driver engaged in driving and whether or not the driver opens his/her eyes, biological information such as a pulse, whether or not the driver breathes, and a skin potential, speech information such as whether or not there is conversation, and the like, which is correlated with driving capability of the driver engaged in driving. Further, the information to be transmitted from the rider state sensor 33 and the on-board communication device 34 included in the on-board equipment 30 to the driving subject information acquirer 61 includes time-series data regarding biological information such as a pulse of the rider, whether or not the rider breathes and a skin potential, which is correlated with driving capability of the rider engaged in driving. Further, the information to be transmitted from the portable information processing terminals 25 and 35 included in the on-board equipment 20 and 30 to the driving subject information acquirer 61 includes personal schedule information of the driver and the rider. In a case where the driver and the rider drive the mobile bodies, for example, under tight schedule, there is a case where the driver and the rider may feel pressed, and driving capabilities may degrade. Thus, it can be said that the personal schedule information of the driver and the rider is information correlated with the driving capabilities of the driver and the rider.

The driving subject information acquirer 61 acquires driving subject characteristic information regarding characteristics (such as, for example, too many times of sudden lane change and too many times of sudden acceleration and deceleration) regarding driving of the driving subject correlated with current driving capability of the driving body engaged in driving by using both or one of the driving subject state information for the driving subject acquired through the following procedure and the registered driving history information read from the driving history database 68.

The driving subject information acquirer 61 transmits the driving subject state information and the driving subject characteristic information of the driving subject acquired as described above to the predictor 62, the soundness-promoting notification specifier 63, the risk notification specifier 64, the coordination support information notifier 65 and the like.

The predictor 62 extracts a traffic area that is part of the target traffic area as a monitoring area and predicts a risk in future of a plurality of traffic participants in the monitoring area on the basis of traffic participant recognition information and traffic environment recognition information (hereinafter, also collectively referred to as "recognition information") acquired by the target traffic area recognizer 60 and driving subject state information and driving subject characteristic information (hereinafter, also collectively referred to as "driving subject information") acquired by the driving subject information acquirer 61. More specifically, the predictor 62 predicts future of each traffic participant in the monitoring area by constructing a virtual space that simulates the monitoring area on the basis of the recognition information acquired by the target traffic area recognizer 60 and performing simulation on the basis of the recognition information and the driving subject information on the virtual space. More specifically, in a case where the prediction target is a mobile body such as a four-wheeled vehicle or a motorcycle that travels on a road, the predictor 62 calculates a future predicted traveling route of the mobile body by performing the simulation as described above. Further, in a case where the prediction target is a pedestrian that moves on a pavement, the predictor 62 calculates a future predicted movement route of the pedestrian by performing the simulation as described above. Note that detailed description of specific procedure for predicting future of each traffic participant in the monitoring area by the predictor 62 will be omitted.

Here, the target traffic area is a traffic area of a relatively broad range determined, for example, in municipal units. In contrast, the monitoring area is a traffic area such as, for example, an area near an intersection and a specific facility, through which a four-wheeled vehicle can pass in an approximately few tens of seconds in a case where the four-wheeled vehicle travels at legal speed. In other words, the monitoring area is narrower than the target traffic area, but is broader than the ADAS actuation range of the driving support ECU mounted on each mobile body.

The soundness-promoting notification specifier 63 sets ON/OFF of the soundness-promoting notification for each of setting targets that are traffic participants recognized as support targets and mobile bodies by the target traffic area recognizer 60 among the plurality of traffic participants present in the target traffic area. Note that as will be described later, the traffic participants that are parties involved with the contact risk predicted to occur by the predictor 62 described above become setting targets of risk notifications by the risk notification specifier 64. It is therefore preferable to exclude the setting targets by the risk notification specifier 64 from setting targets by the soundness-promoting notification specifier 63.

More specifically, first, the soundness-promoting notification specifier 63 acquires driving subject information associated with a driving subject of each setting target that is a mobile body from the driving subject information acquirer 61. Further, the soundness-promoting notification specifier 63 calculates current soundness of the driving subject for each of the setting targets on the basis of the acquired driving subject information. Further, in a case where the soundness calculated for each of the setting targets is less than a predetermined soundness threshold, the soundness-promoting notification specifier 63 determines that the driving subject of the setting target is in an unsound state and sets the soundness-promoting notification set value to "1" to the setting target to set ON of the soundness-promoting notification to the setting target. Further, in a case where the soundness calculated for each setting target is equal to or greater than the soundness threshold, the soundness-promoting notification specifier 63 determines that the driving subject of the setting target is in a sound state and sets the soundness-promoting notification set value for the setting target to "0" to set OFF of the soundness-promoting notification of the setting target.

The soundness-promoting notification specifier 63 sets ON or OFF of the soundness-promoting notification for the plurality of setting targets in the target traffic area through the procedure as described above. Information regarding the soundness-promoting notification set value set for each setting target by the soundness-promoting notification specifier 63 is transmitted to the coordination support information notifier 65.

The risk notification specifier 64 sets an operation manner (that is, a type of the notification mode and ON/OFF of the risk notification) of the risk notification for each of setting targets that are traffic participants recognized as support targets by the target traffic area recognizer 60 among the plurality of traffic participants present in the monitoring area extracted from the target traffic area by the predictor 62 on the basis of the prediction result by the predictor 62, the recognition information acquired by the target traffic area recognizer 60, the driving subject information acquired by the driving subject information acquirer 61, and the like.

More specifically, the risk notification specifier 64 sets an operation manner of the risk notification for each of the setting targets present in the monitoring area on the basis of information related to the monitoring area among the recognition information acquired by the target traffic area recognizer 60, information related to the monitoring area among the driving subject information acquired by the driving subject information acquirer 61 and the prediction result for the monitoring area by the predictor 62. In other words, the risk notification specifier 64 sets the risk notification set value to one of "0", "1", "2", "3" and "4" (in a case where the setting target is a pedestrian, one of "0", "1" and "2") for each of the setting targets.

Figure 4A:
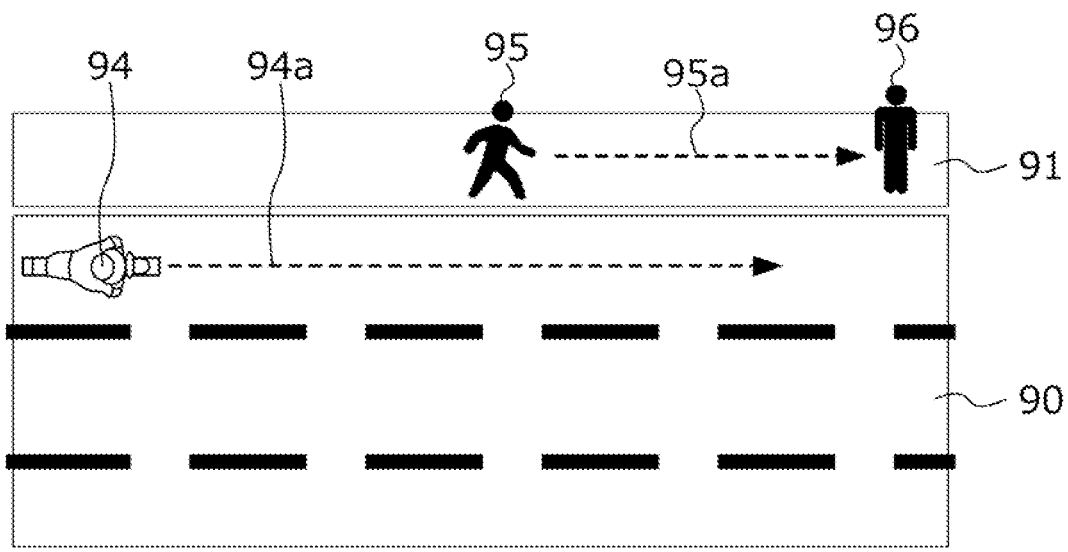
FIG. 4A is a view illustrating an example of a monitoring area.
Figure 4B:
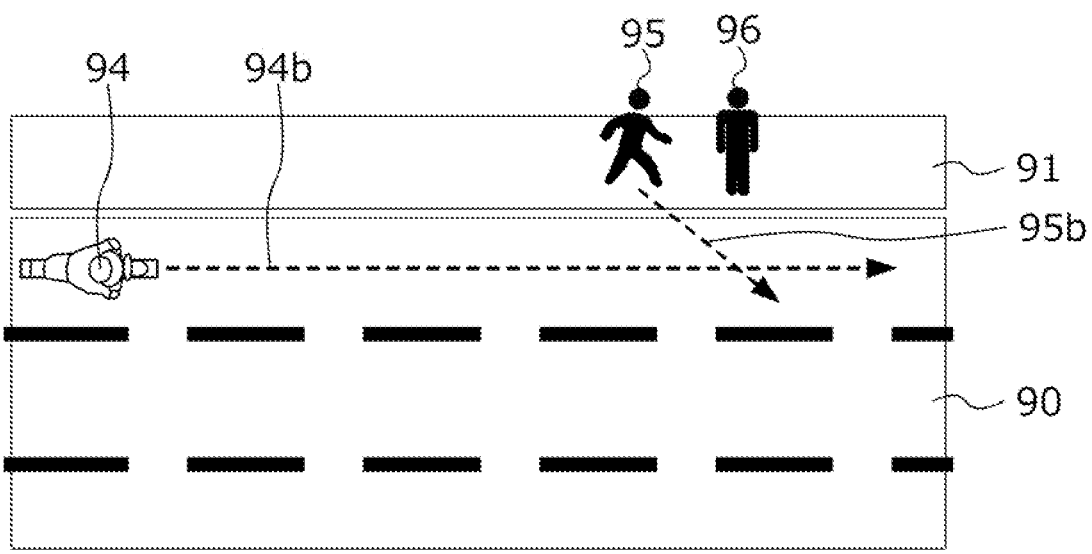
FIG. 4B is a view illustrating an example of the monitoring area.

Note that in the following description, specific procedure for setting an operation manner of the risk notification to each setting target by the risk notification specifier 64 will be described using an example of a case where the mobile body that is the first support target is traveling in the monitoring area as illustrated in FIG. 4A and FIG. 4B, that is, a mobile body 94 (a motorcycle in the example of FIG. 4A and FIG. 4B) that is the first support target is traveling on a road 90 adjacent to a pavement 91. Note that FIG. 4A and FIG. 4B illustrate a case where a guardrail is not provided between the road 90 and the pavement 91, and a first pedestrian 95 who is moving ahead of the mobile body 94 that is the first support target in the same direction as the mobile body 94 and a second pedestrian 96 who stands still ahead of the first pedestrian 95 is present on the pavement 91. Further, in the example of FIG. 4A and FIG. 4B, the first pedestrian 95 is set as the second support target.

Figure 5A:
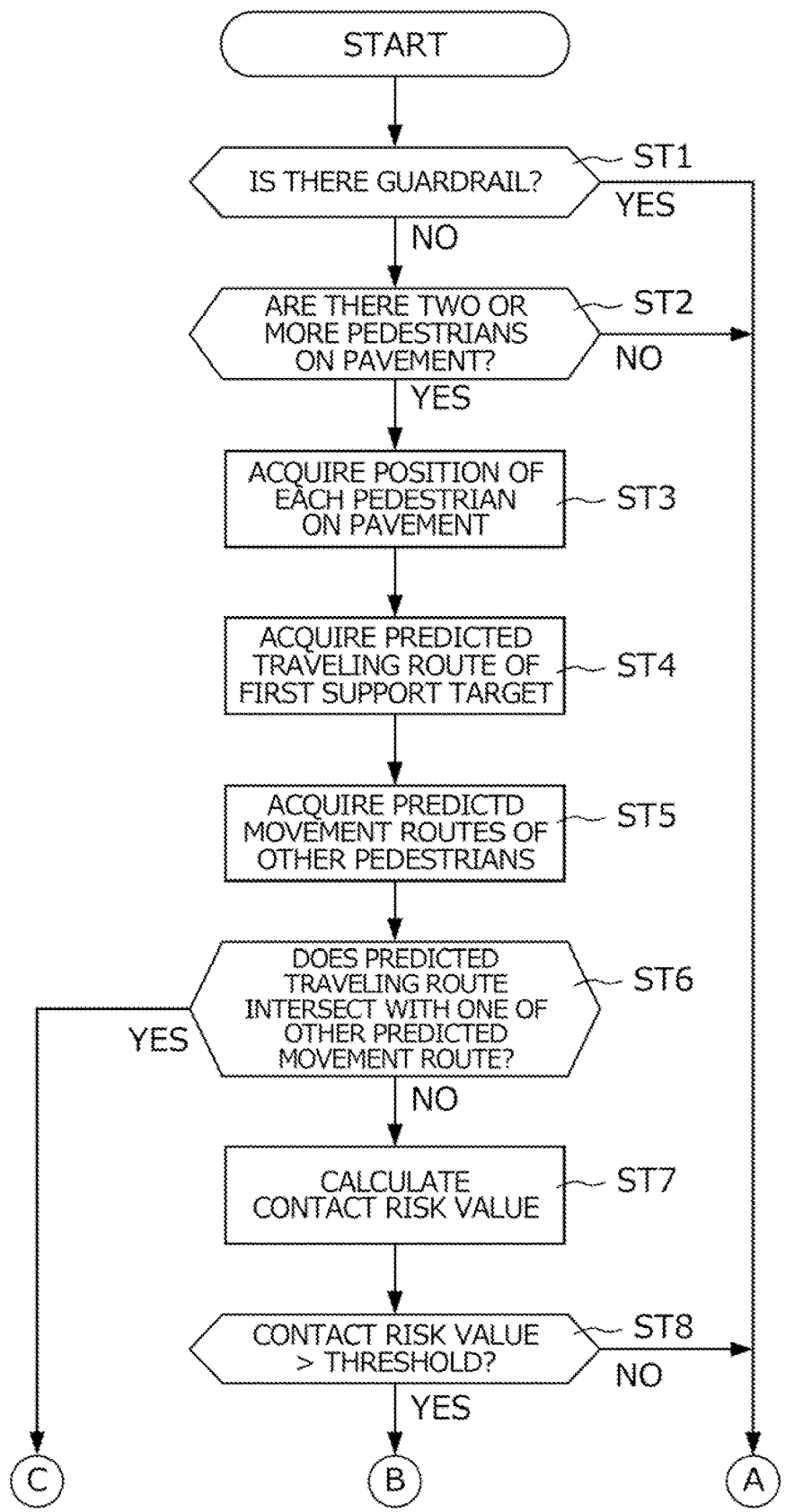
FIG. 5A is a flowchart illustrating procedure of setting an operation manner of risk notification of a first support target that is traveling on a road along a pavement.

FIG. 5A and FIG. 5B are flowcharts illustrating procedure of setting an operation manner of risk notification to a first support target that is a mobile body traveling on a road along a pavement. The processing illustrated in FIG. 5A and FIG. 5B is repeatedly executed with a predetermined control period by the risk notification specifier 64 while the first support target is traveling on the road along the pavement.

First, in step ST1, the risk notification specifier 64 determines whether or not a guardrail exists between the road on which the first support target travels and the pavement adjacent to the road on the basis of the recognition information. In a case where the determination result in step ST1 is Yes, the risk notification specifier 64 determines that the first support target does not come into contact with a pedestrian on the road, and the processing transitions to step ST9. In step ST9, the risk notification to the first support target is turned OFF by setting the risk notification set value for the first support target to "0", and the processing illustrated in FIG. 5A and FIG. 5B is finished. Note that in step ST9, in a case where another support target (in the example in FIG. 4A, the first pedestrian 95) recognized as a pedestrian is present in the monitoring area around the first support target, the risk notification specifier 64 sets the risk notification set value for the other support target to "0" to turn OFF the risk notification. In a case where the determination result in step ST1 is No, the processing of the risk notification specifier 64 transitions to step ST2.

In step ST2, the risk notification specifier 64 determines whether or not at least two pedestrians present ahead of the first support target on the pavement on the basis of the recognition information. In a case where the determination result in step ST2 is No, the risk notification specifier 64 determines that the first support target does not come into contact with a pedestrian on the road, and the processing transitions to step ST9. Further, in a case where the determination result in step ST2 is Yes, the processing of the risk notification specifier 64 transitions to step ST3.

In step ST3, the risk notification specifier 64 acquires a position of each pedestrian present ahead of the first support target on the pavement on the basis of the recognition information, and the processing transitions to step ST4.

In step ST4, the risk notification specifier 64 acquires a predicted traveling route of the first support target from the predictor 62, and the processing transitions to step ST5. In step ST5, the risk notification specifier 64 acquires a predicted movement route of each pedestrian on the pavement from the predictor 62, and the processing transitions to step ST6.

In step ST6, the risk notification specifier 64 determines whether or not the predicted traveling route of the first support target intersects with one of the predicted movement routes of the respective pedestrians on the road. In a case where the determination result in step ST6 is No (in a case where a predicted traveling route 94*a* of the mobile body 94 that is the first support target does not intersect with a predicted movement route 95*a* of the first pedestrian 95 on the road as illustrated in FIG. 4A), the risk notification specifier 64 determines that a risk of the pedestrian on the pavement moving to the road from the pavement and the first support target coming into contact with the pedestrian on the road does not become apparent, and the processing transitions to step ST7.

In step ST7, the risk notification specifier 64 calculates a contact risk value corresponding to a possibility (hereinafter, simply referred to as a "contact risk") that the pedestrian who is present on the pavement at the present moment may come into contact on the road with the first support target that is traveling on the road at the present moment in the near future, and the processing transitions to step ST8.

Here, procedure for calculating the contact risk value in step ST7 will be described. The risk notification specifier 64 calculates the contact risk value while taking into account various parameters correlated with a contact risk of a pedestrian and the first support target on the road as described above.

First, the risk notification specifier 64 acquires the number of pedestrians present on the pavement within the monitoring area on the basis of the recognition information and calculates the contact risk value on the basis of the number of pedestrians. More specifically, the risk notification specifier 64 calculates the contact risk value so as to be a greater value as the number of pedestrians present on the pavement within the monitoring area increase.

Second, the risk notification specifier 64 calculates the contact risk value on the basis of whether or not predicted movement routes of the respective pedestrians acquired in step ST5 intersect with each other on the pavement. More specifically, the risk notification specifier 64 calculates the contact risk value so as to be a greater value in a case where the predicted movement routes of the respective pedestrians intersect with each other than in a case where the predicted movement routes of the respective pedestrians do not intersect with each other. Note that a case where two predicted movement routes intersect with each other includes a case where one pedestrian passes the other pedestrian in front in addition to a case where both pedestrians face each other.

Third, the risk notification specifier 64 acquires a pavement width and a width of each pedestrian on the basis of the recognition information and calculates a pavement width occupancy that is a proportion of the pedestrian to the pavement width for each of the pedestrians. Further, the risk notification specifier 64 calculates the contact risk value on the basis of all or one of pavement width occupancies of the respective pedestrians. More specifically, the risk notification specifier 64 calculates the contact risk value so as to be a greater value as the pavement width occupancies for the respective pedestrians become greater. Further, for example, the risk notification specifier 64 may calculate the contact risk value so as to be a greater value in a case where a sum of the pavement width occupancies of the respective pedestrians exceeds 100[%] than in a case where the sum of the pavement width occupancies of the respective pedestrians does not exceed 100[%].

Fourth, the risk notification specifier 64 estimates a position of a predicted point at which one of the pedestrians moves from the pavement to the road on the basis of the predicted movement routes of the pedestrians and calculates the contact risk value on the basis of the position of the predicted point. More specifically, for example, a point at which the two predicted movement routes intersect can be set as the predicted point. More specifically, the risk notification specifier 64 calculates the contact risk value so as to be a greater value as a distance between the position of the predicted point and a current first support target becomes shorter.

Fifth, in a case where a user ID of one of the pedestrians can be specified, the risk notification specifier 64 refers to movement history of the pedestrian from the pedestrian history database 69 on the basis of the user ID and calculates the contact risk value on the basis of the movement history. More specifically, the risk notification specifier 64 determines whether or not the pedestrian tends to habitually deviate from the pavement to the road on the basis of the movement history of the pedestrian and calculates the contact risk value on the basis of the determination result.

In step ST8, the risk notification specifier 64 determines whether or not the contact risk value calculated in step ST7 is greater than a predetermined threshold. In a case where the determination result in step ST8 is No, the risk notification specifier 64 determines that the first support target does not come into contact with the pedestrian on the road, and the processing transitions to step ST9.

In a case where the determination result in step ST8 is Yes, the risk notification specifier 64 determines that there is a possibility that the pedestrian may move from the pavement to the road and the first support target may come into contact with the pedestrian on the road in the near future, and the processing transitions to step ST10. In step ST10, the risk notification specifier 64 executes the risk notification to the first support target in the hinting notification mode by setting the risk notification set value for the first support target to "1" or "3", and the processing transitions to step ST11. By this means, the risk notification with a low notification intensity that suggests presence of the pedestrian (in the example in FIG. 4A, the first pedestrian 95) on the pavement is made to the driver (in the example in FIG. 4A, the driver of the mobile body 94) of the first support target.

In step ST11, the risk notification specifier 64 specifies a pedestrian predicted to move from the pavement to the road, and in a case where the pedestrian is a support target, executes the risk notification to the support target in the hinting notification mode by setting the risk notification set value for the support target (in the example in FIG. 4A, the first pedestrian 95) to "1", and the processing illustrated in FIG. 5A and FIG. 5B is finished. By this means, the risk notification with a low notification intensity that suggests presence of the mobile body (in the example in FIG. 4A, the mobile body 94) that travels on the road is made to the pedestrian (in the example in FIG. 4A, the first pedestrian 95) who is likely to move from the pavement to the road.

Further, in a case where the determination result in step ST6 is Yes (in a case where the predicted traveling route 94b of the mobile body 94 that is the first support target intersects with the predicted movement route 95b of the first pedestrian 95 on the road 90 as illustrated in FIG. 4B), the risk notification specifier 64 determines that a contact risk of the first support target and the pedestrian on the road becomes apparent, and the processing transitions to step ST12.

In step ST12, the risk notification specifier 64 executes the risk notification to the first support target in the analog notification mode by setting the risk notification set value for the first support target to "2" or "4", and the processing transitions to step ST13. By this means, the risk notification with a high notification intensity that strongly suggests that the own vehicle approaches a pedestrian (in the example in FIG. 4B, the first pedestrian 95) who is likely to come into contact with the own vehicle on the road is made to the driver (in the example in FIG. 4B, the driver of the mobile body 94) of the first support target.

In step ST13, the risk notification specifier 64 determines whether or not the predicted traveling route of the first support target and the predicted movement route of the pedestrian predicted to intersect in step ST6 intersects with each other on a crosswalk. In a case where the determination result in step ST13 is Yes, the processing of the risk notification specifier 64 transitions to step ST11 to refrain from the risk notification to the pedestrian in the analog notification mode. Note that in a case where the determination result in step ST13 is Yes, the processing may transition to step ST9 instead of step ST11, and the risk notification to the pedestrian may be turned OFF. Pedestrians are basically prioritized at the crosswalk, and excessive notifications to the pedestrians on the crosswalk may annoy the pedestrians, and thus, it is preferable to decrease a notification intensity compared to a case where the determination result in step ST13 is No or turn OFF the risk notification.

Further, in a case where the determination result in step ST13 is NO, the processing of the risk notification specifier 64 transitions to step ST14. In step ST14, the risk notification specifier 64 specifies a pedestrian who tries to move from the pavement to the road, and in a case where the pedestrian is a support target, executes the risk notification to the support target in the hinting notification mode by setting the risk notification set value for the support target (in the example in FIG. 4B, the first pedestrian 95) to "2", and the processing illustrated in FIG. 5A and FIG. 5B is finished. By this means, the risk notification with a higher notification intensity that strongly suggests that the mobile body (in the example in FIG. 4B, the mobile body 94) traveling on the road approaches to the pedestrian is made to the pedestrian (in the example in FIG. 4B, the first pedestrian 95) who tries to move from the pavement to the road.

Returning to FIG. 2, the coordination support information notifier 65 generates coordination support information for encouraging individual traffic participants recognized as the support targets by the target traffic area recognizer 60 to perform communication among the surrounding traffic participants and recognize surrounding traffic environments on the basis of the recognition information acquired by the target traffic area recognizer 60, the driving subject information acquired by the driving subject information acquirer 61, the prediction result by the predictor 62, information regarding the soundness-promoting set value set by the soundness-promoting notification specifier 63 and information regarding the risk notification set value set by the risk notification specifier 64 and transmits the generated coordination support information to each traffic participant.

Here, the coordination support information to be transmitted from the coordination support information notifier 65 to each support target includes the information regarding the soundness-promoting set value, the information regarding the risk notification set value, and risk information regarding the risk that comes near to each support target. Here, the risk information includes, for example, the prediction result by the predictor 62, information regarding positions of the traffic participants that are present near each traffic participant, and the like.

According to the traffic safety support system 1 according to the present embodiment, the following effects are provided.

(1) In the traffic safety support system 1, in a case where a support target that is a mobile body is traveling on a road adjacent to a pavement and a first pedestrian present ahead of the support target on the pavement, the risk notification specifier 64 calculates a contact risk value of contact between the first pedestrian and the support target on the road on the basis of recognition information and in a case where the contact risk value exceeds a threshold, sets the risk notification to ON. Here, in a case where there are other pedestrians near the pedestrian moving on the pavement, the pedestrian tries to move while avoiding the other pedestrians, and thus, the number of pedestrians present in the vicinity of the first pedestrian on the pavement correlates with a possibility that the first pedestrian runs out into the road and comes into contact with the support target. Thus, in the traffic safety support system 1, the risk notification specifier 64 calculates the contact risk value on the basis of the number of pedestrians present in the vicinity of the first pedestrian on the pavement. By this means, the driver of the support target can recognize existence of such a risk through the risk notification before the pedestrian actually runs out into the road, so that it is possible to prevent contact between the support target and the first pedestrian on the road. Thus, according to the traffic safety support system 1, it is possible to improve safety, convenience and smoothness for traffic by mobile bodies traveling on a road and pedestrians moving on a pavement adjacent to the road.

(2) The risk notification specifier 64 calculates the contact risk value on the basis of whether or not a first predicted movement route of the first pedestrian intersects with a second predicted movement route of a second pedestrian. If the two movement routes intersect on the pavement, there is a possibility that one of the pedestrians may run out into the road to avoid each other.

According to the traffic safety support system 1, such a potential risk can be appropriately grasped, so that it is possible to prevent contact of the support target and the first or the second pedestrian on the road. Thus, according to the traffic safety support system 1, it is possible to improve safety, convenience and smoothness for traffic by mobile bodies traveling on a road and pedestrians moving on a pavement adjacent to the road.

(3) In the traffic safety support system 1, the risk notification specifier 64 calculates the contact risk value on the basis of both or one of a first pavement width occupancy of the first pedestrian and a second pavement width occupancy of the second pedestrian. As the pavement width occupancy of the pedestrians on the pavement increases, a possibility that one of the pedestrians may run out into the road when passing each other increases. According to the traffic safety support system 1, by calculating the contact risk value on the basis of these pavement width occupancies, it is possible to appropriately determine a timing for turning ON risk notification.

(4) In the traffic safety support system 1, in a case where the predicted traveling route of the support target intersects with neither the first predicted movement route nor the second predicted movement route on the road, and the contact risk value exceeds a threshold, a notification mode for the support target is set to a hinting notification mode. By this means, in a situation where a risk that one of the first and the second pedestrians might run out into the road potentially exists, by making the risk notification in the hinting notification mode, it is possible to cause a driver of the support target to recognize existence of a potential contact risk. Further, in the traffic safety support system 1, in a case where the predicted traveling route of the support target intersects with one of the first and the second predicted movement routes on the road, that is, in a case where a contact risk of the support target and one of the first and the second pedestrians on the road becomes apparent, the notification mode is set to an analog notification mode with a higher notification intensity than the hinting notification mode, and the risk notification is made. By this means, by strongly inviting attention of the driver of the support target, it is possible to cause the driver to perform action for avoiding the contact risk.

(5) The risk notification specifier 64 estimates a position of a predicted point at which one of the first and the second pedestrians moves from the pavement to the road on the basis of the first predicted movement route and the second predicted movement route and calculates the contact risk value on the basis of the position of the predicted point. By this means, it is possible to set the risk notification to ON at an appropriate timing in view of the point at which one of the first and the second pedestrians is predicted to move from the pavement to the road.

(6) In the traffic safety support system 1, in a case where a first support target that is a mobile body is traveling on a road adjacent to a pavement and a second support target that is a pedestrian is present ahead of the first support target on the pavement, the risk notification specifier 64 calculates a contact risk value of contact between the first support target and the second support target on the road on the basis of recognition information, and in a case where the contact risk value exceeds a threshold, sets the risk notification by notification devices 22 and 32 of the first support target and a notification device 42 of the second support target to ON in a hinting notification mode. Here, in a case where other pedestrians are present near the pedestrian who moves on the pavement, the pedestrian tries to move while avoiding the other pedestrians, and thus, the number of other pedestrians present in the vicinity of the second support target on the pavement correlates with a possibility that the second support target may run out into the road and come into contact with the first support target on the road. Thus, in the traffic safety support system 1, the risk notification specifier 64 calculates the contact risk value on the basis of the number of pedestrians present in the vicinity of the second support target on the pavement, and in a case where the contact risk value exceeds a threshold, sets ON of the risk notification by the notification devices 22 and 32 of the first support target and the notification device 42 of the second support target in the hinting notification mode. By this means, the second support target can recognize presence of the first support target that travels on the road through the risk notification by the notification device 42, and thus, can avoid other pedestrians while paying attention so as not to deviate to the road. Further, the first support target can recognize presence of the second support target who is likely to move from the pavement to the road through the risk notification by the notification devices 22 and 32, and thus, can travel on the road while paying attention so as not to come into contact with the second support target when traveling near the second support target. Thus, according to the traffic safety support system 1, the driver of the first support target that travels on the road and the second support target that moves on the pavement can recognize presence of each other, so that it is possible to prevent contact of the first support target and the second support target on the road. Thus, according to the traffic safety support system 1, it is possible to improve safety, convenience and smoothness of traffic by mobile bodies traveling on a road and pedestrians moving on a pavement adjacent to the road.

While one embodiment of the present invention has been described above, the present invention is not limited to this. Detailed configurations may be changed as appropriate within a scope of the gist of the present invention. For example, while in the above-described embodiment, a case has been described where a recognizer configured to recognize traffic participants present near a support target that is a mobile body and traffic environments around the support target, and a risk notification specifier configured to set an operation manner of risk notification of a notification device that makes a risk notification to a driver of the support target are provided in a coordination support device 6 capable of wirelessly communicating with the support target respectively as the target traffic area recognizer 60 and the risk notification specifier 64, the present invention is not limited to this. The recognizer and the risk notification specifier may be constituted with on-board equipment to be mounted on the support target. In this case, while a range of the monitoring area to be recognized by the recognizer is limited to a range recognizable by an external sensor mounted on the support target, there is an advantage of making a delay due to communication smaller.

What is claimed is:

1. A traffic safety support system that for assisting a driver in driving a support target being a mobile body, the traffic safety support system comprising:

a recognizer configured to recognize traffic participants present near the support target and traffic environments around the support target, and acquire recognition information;

a notification device configured to provide a risk notification to the driver; and a risk notification specifier configured to set an operation manner of the risk notification on a basis of the recognition information, wherein the risk notification specifier comprises:

a contact risk value calculator configured to, in a case where the support target is traveling on a road adjacent to a pavement and a first pedestrian is present ahead of the support target on the pavement, calculate a contact risk value of contact between the first pedestrian and the support target on the road on a basis of the recognition information; and a specifier configured to, in a case where the contact risk value exceeds a predetermined threshold, set the risk notification to ON; and the contact risk value calculator calculates the contact risk value on a basis of a number of second pedestrians present in a vicinity of the first pedestrian on the pavement, and both or one of a first pavement width occupancy that is a proportion of the first pedestrian to a pavement width and a second pavement width occupancy that is a proportion of the second pedestrians to the pavement width.

2. The traffic safety support system according to claim 1, further comprising:

a predictor configured to predict a first predicted movement route of the first pedestrian on the pavement and a second predicted movement route of a second pedestrian present in a vicinity of the first pedestrian on the basis of the recognition information, wherein the contact risk value calculator calculates the contact risk value on a basis of whether or not the first predicted movement route intersects with the second predicted movement route.

3. The traffic safety support system according to claim 2, wherein the notification device is capable of providing the risk notification in a plurality of notification modes with different notification intensities, and the specifier sets a first mode as the notification mode in a case where a predicted traveling route of the support target intersects with neither the first predicted movement route nor the second predicted movement route on the road and the contact risk value exceeds the threshold, and sets a second mode with a higher notification intensity than the first mode as the notification mode in a case where the predicted traveling route intersects with the first predicted movement route or the second predicted movement route on the road.

4. The traffic safety support system according to claim 1, wherein the notification device is capable of providing the risk notification in a plurality of notification modes with different notification intensities, and the specifier sets a first mode as the notification mode in a case where a predicted traveling route of the support target intersects with neither the first predicted movement route nor the second predicted movement route on the road and the contact risk value exceeds the threshold, and sets a second mode with a higher notification intensity than the first mode as the notification mode in a case where the predicted traveling route intersects with the first predicted movement route or the second predicted movement route on the road.

5. The traffic safety support system according to claim 2, wherein the contact risk value calculator estimates a position of a predicted point at which the first pedestrian or the second pedestrian moves from the pavement to the road on a basis of the first predicted movement route and the second predicted movement route and calculates the contact risk value on a basis of the position of the predicted point.

6. The traffic safety support system according to claim 1, wherein the contact risk value calculator estimates a position of a predicted point at which the first pedestrian or the second pedestrian moves from the pavement to the road on a basis of the first predicted movement route and the second predicted movement route and calculates the contact risk value on a basis of the position of the predicted point.

7. The traffic safety support system according to claim 3, wherein the contact risk value calculator estimates a position of a predicted point at which the first pedestrian or the second pedestrian moves from the pavement to the road on a basis of the first predicted movement route and the second predicted movement route and calculates the contact risk value on a basis of the position of the predicted point.

8. The traffic safety support system according to claim 4, wherein the contact risk value calculator estimates a position of a predicted point at which the first pedestrian or the second pedestrian moves from the pavement to the road on a basis of the first predicted movement route and the second predicted movement route and calculates the contact risk value on a basis of the position of the predicted point.

9. A traffic safety support system for supporting a driver in driving a first support target being a mobile body and supporting a second support target being a pedestrian in moving, the traffic safety support system comprising:

a recognizer configured to recognize traffic participants present near the first support target and traffic environments around the first support target, and acquire recognition information;

a first notification device configured to provide a risk notification to the driver of the first support target;

a second notification device configured to provide the risk notification to the second support target; and a risk notification specifier configured to set an operation manner in which the first notification device and the second notification device provide the risk notification, on a basis of the recognition information, wherein the risk notification specifier comprises:

a contact risk value calculator configured to, in a case where the first support target is traveling on a road adjacent to a pavement and the second support target is present ahead of the first support target on the pavement, calculate a contact risk value of contact between the first support target and the second support target on the road on a basis of the recognition information; and a specifier configured to, in a case where the contact risk value exceeds a predetermined threshold, set the risk notification by the first notification device and the second notification device to ON, and the contact risk value calculator calculates the contact risk value on a basis of a number of other pedestrians present in a vicinity of the second support target on the pavement, and both or one of a first pavement width occupancy that is a proportion of the second support target to a pavement width and a second pavement width occupancy that is a proportion of the other pedestrians to the pavement width.

* * * * *